US008430726B2

(12) United States Patent
Töpfer

(10) Patent No.: US 8,430,726 B2
(45) Date of Patent: Apr. 30, 2013

(54) PRODUCTION LINE FOR THE MANUFACTURE OF SAUSAGE-SHAPED PRODUCTS

(75) Inventor: Klaus Töpfer, Büttelborn (DE)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 776 days.

(21) Appl. No.: 11/851,070

(22) Filed: Sep. 6, 2007

(65) Prior Publication Data

US 2008/0064313 A1 Mar. 13, 2008

(30) Foreign Application Priority Data

Sep. 6, 2006 (DE) .......................... 10 2006 041 829

(51) Int. Cl.
*A22C 11/00* (2006.01)
*A22C 15/00* (2006.01)
(52) U.S. Cl.
USPC .............................................. 452/51; 452/31
(58) Field of Classification Search ............... 452/30–31, 452/46–51
See application file for complete search history.

(56) References Cited

U.S. PATENT DOCUMENTS

| | | | | |
|---|---|---|---|---|
| 2,697,850 | A | * | 12/1954 | Cross .............................. 452/47 |
| 4,091,505 | A | * | 5/1978 | Muller et al. .................... 452/47 |
| 4,547,931 | A | * | 10/1985 | Staudenrausch et al. ........ 452/51 |
| 4,612,684 | A | | 9/1986 | Kollross |
| 4,682,385 | A | * | 7/1987 | Kasai et al. ..................... 452/51 |
| 4,694,537 | A | | 9/1987 | Kollross |

(Continued)

FOREIGN PATENT DOCUMENTS

| | | |
|---|---|---|
| DE | 1291283 | 2/1934 |
| DE | 69718065 | 6/2003 |

(Continued)

OTHER PUBLICATIONS

EP 07 017 500.5 Search Report.

(Continued)

*Primary Examiner* — David Parsley
(74) *Attorney, Agent, or Firm* — Hahn Loeser & Parks LLP

(57) ABSTRACT

A method for controlling a production line for manufacturing sausage-shaped products, a production line provided for this as well as a clip machine and a feeding machine for the manufacture of sausage-shaped products, with a flowable filling material such as sausage meat, a sealing material, granulate and the like being received in a tubular wrapper material and with the production line having at least: a clip machine, in which the wrapper material filled with filling material is divided into portions into individual sausage-shaped products by placing closing clips and is separated from the supply of the remaining wrapper material; with at least one flexible suspension element being applied to the sausage-shaped product during the placing of the closing clips, which is fed in a timed manner into the clip machine; and a feeding machine, which supplies the storage rods individually for further processing of the sausage-shaped products and which has conveyor elements, circulating continuously along a transport path, which is used to supply the storage rods with sausage-shaped products and which takes the sausage-shaped products proceeding out of the clip machine into a takeover area provided between the clip machine, and the feeding machine. In addition, at least the circulation rate of the conveyor elements of the feeding machine.

61 Claims, 15 Drawing Sheets

U.S. PATENT DOCUMENTS

| | | | |
|---|---|---|---|
| 4,880,105 A * | 11/1989 | Kasai et al. | 198/465.4 |
| 5,082,419 A | 1/1992 | Kollross et al. | |
| 5,100,364 A | 3/1992 | Kollross et al. | |
| 5,163,864 A | 11/1992 | Burger et al. | |
| 5,197,915 A * | 3/1993 | Nakamura et al. | 452/51 |
| 5,283,353 A * | 2/1994 | Rasmussen et al. | 536/17.2 |
| 5,354,230 A * | 10/1994 | McFarlane et al. | 452/51 |
| 5,405,288 A * | 4/1995 | Stanley | 452/48 |
| 5,755,022 A * | 5/1998 | Whittlesey | 29/788 |
| 6,287,189 B1 * | 9/2001 | Moro et al. | 452/49 |
| 6,409,460 B1 | 6/2002 | Leining | |
| 6,494,311 B2 | 12/2002 | Muller | |
| 6,524,178 B1 * | 2/2003 | Fassler et al. | 452/37 |
| 6,786,321 B2 * | 9/2004 | Borkiewicz et al. | 198/419.3 |
| 7,249,997 B2 * | 7/2007 | Kasai | 452/51 |
| 2002/0083848 A1 | 7/2002 | Mueller et al. | |
| 2005/0042061 A1 | 2/2005 | Sames | |

FOREIGN PATENT DOCUMENTS

| | | |
|---|---|---|
| EP | 0330857 | 9/1989 |
| FR | 1483818 | 6/1967 |
| WO | 92/03929 A1 | 3/1992 |

OTHER PUBLICATIONS

German Search Report for DE 10 2006 041 829.8-23.

* cited by examiner

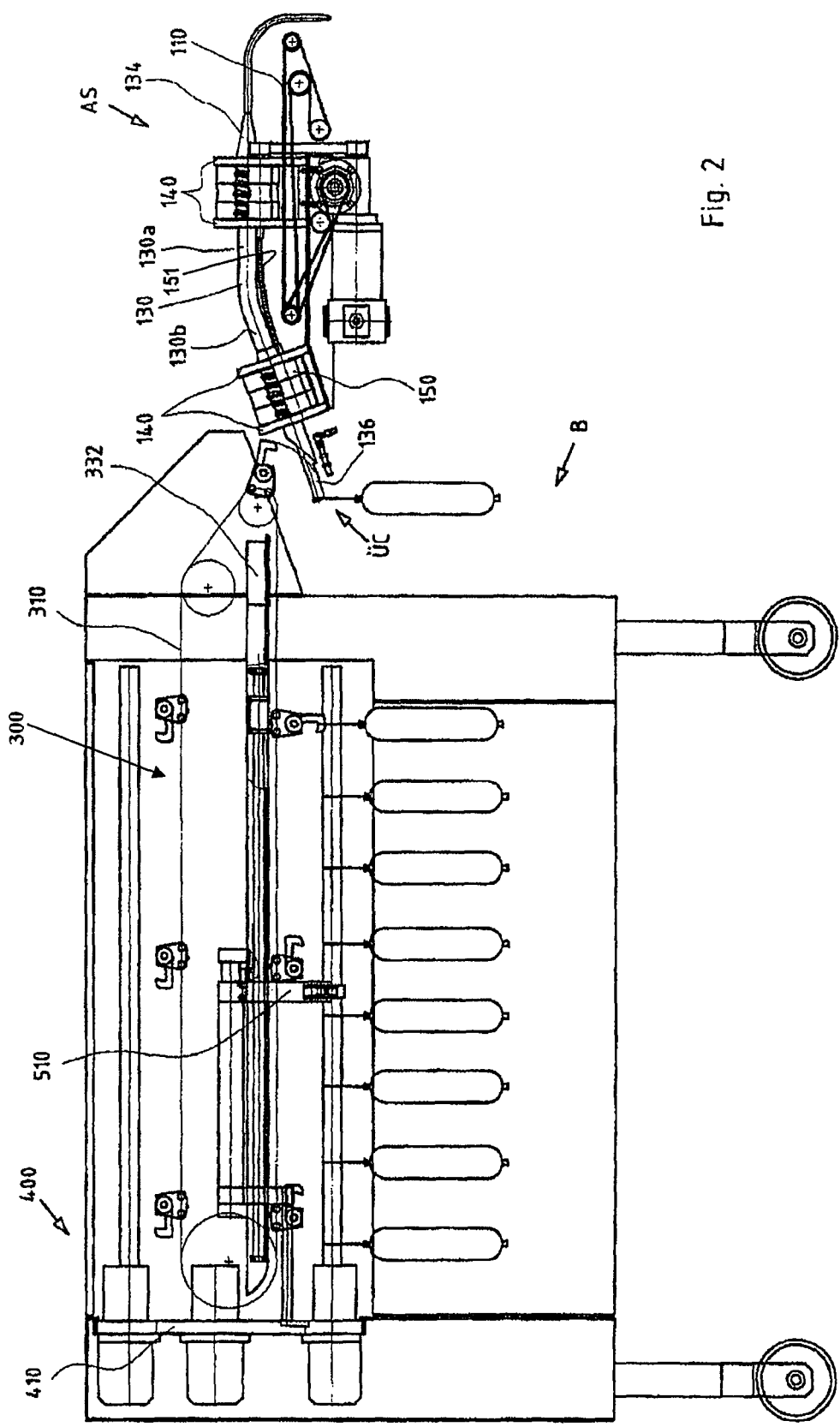

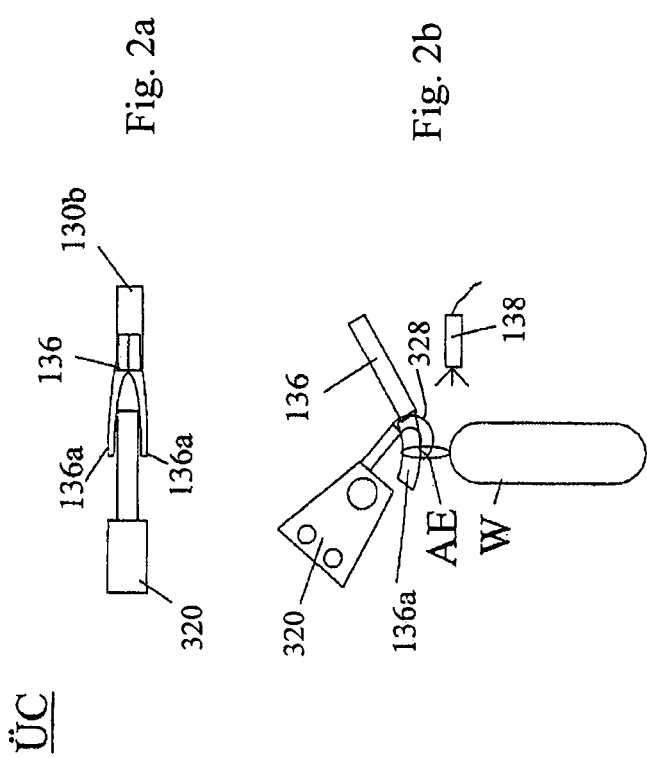

PRODUCTION LINE FOR THE MANUFACTURE OF SAUSAGE-SHAPED PRODUCTS

BACKGROUND AND SUMMARY OF THE INVENTION

The invention relates to a method for controlling a production line for the manufacture of sausage-shaped products, a production line for the aforementioned purpose as well as a clip machine and a feeding machine for a production line for manufacturing sausage-shaped products.

It is known from experience, for example, that during the manufacture of sausages the sausage meat is fed from a filling machine via a filling pipe to a clip machine. In the clip machine the filling material filled into enclosed, tubular packaging material, is closed on one side with a first clip, and then closed by placing a second clip. If the sausage-shaped product or the sausage product is to be suspended for further processing, a suspension element is normally inserted into the second clip, usually a thread loop, and fastened with this second clip to the sausage product. Then the sausage products are aligned on the storage rods in order to be processed further, for example, to be smoked.

From DE 39 35 746 A1 (U.S. Pat. No. 5,100,364) a method and a device for the mechanized suspension of sausage products is known. In the process a transfer device, consisting of two initially congruent, adjacent, pivotable, partial hooks, engages the suspension element formed by a thread loop and removes the sausage product from the clip machine. Then the two hooks of the transfer device are pivoted from the removal position, in which the sausage product was removed from the clip machine, into a transfer position. The two hooks are then separated at the same time.

In the transfer position the sausage product is transferred to a conveyor element of an endless conveyor. The conveyor elements have two spaced hooks for this at their lower end, with the distance between them being less than the distance of the spread hooks of the transfer device. The hooks of the conveyor element engage the spread loop of the sausage products and then remove it from the transfer device. The transfer device can then be rotated further until it reaches its initial position in which the partial hooks lie next to one another.

By means of the conveyor element the sausage product suspended from it is placed on a storage rod fixed on one side. For that the conveyor element is conducted parallel past the storage rod so that the loop is threaded onto the rod. Once a specific position is attained, a press beam presses the hooks of the conveyor elements down so far that the loop of the sausage products is placed on the rod. Then the conveyor element is moved along further so that the hooks disengage from the loop so that the sausage product remains in the appropriate position on the rod. Then the hooks are unloaded by lifting the press beam.

A disadvantage of this known method or this known device is that the alignment of the transfer device to the removal position on the clip machine and to the conveyor element located in the transfer position must be extremely precise. Even the slightest deviations can lead to the loops of the transfer device either not being picked up in the removal position on the clip machine and/or not being transferred in the transfer position to the conveyor elements. Even discontinuous conveyance by halting the conveyor elements for the takeover of the sausage products from the transfer device proves to be detrimental, since swinging movements of the sausages suspended from other conveyor elements can be triggered by the stopping and restarting of the endless conveyor, which leads to additional stresses on the transport unit. Furthermore, the press beam, which causes the lowering of the hooks of the conveyor elements, must extend the entire length of a storage rod, since it can only distribute the sausage products along the entire storage rod by lowering the hooks of a conveyor element. Finally, exact halting of the conveyor elements is required to assure even spacing of the sausage products on the storage rod.

Disclosed is a method for controlling a production line for the manufacturing of sausage-shaped products and to supply a production line, a clip machine and a feeding machine of the type mentioned at the beginning, which will overcome the disadvantages mentioned and enable a continuous loading of storage rods, reliable in terms of the process, with suspended sausage-shaped products hanging from suspension elements.

In particular, a method is proposed for controlling a production line for manufacturing sausage-shaped products, with the sausage-shaped products in a tubular wrapper material receiving a filling material, such as sausage meat, a sealing material, a granulate and the like. The production line contains at least one clip machine, in which the wrapper material filled with filling material is divided into portions into individual sausage-shaped products by the closing clips and is separated from the supply of the remaining wrapper material, at least one flexible suspension element is attached to the sausage-shaped product during the placement of the closing clips, which are fed in a timed manner into the clip machine, and a feeding machine which supplies or loads the storage rods individually for further processing of the sausage-shaped products. In the process, circulating conveyor elements, running continuously along a transport path, are used to supply the storage rods with sausage-shaped products, which take the sausage-shaped products proceeding out of the clip machine into a takeover area provided between the clip machine and the feeding machine. Furthermore, at least the revolving rate of the transport elements of the feeding machine are controlled on the basis of a control variable derived from the clip machine.

As a result of controlling at least the revolving rate of the conveyor elements of the feeding machine on the basis of a control variable derived from the clip machine, an initial coordination of the feeding machine with the clip machine is attained and thus with the production rate in the clip machine. A simple interlocking conveyance between clip machine and feeding machine is provided. Furthermore, the option of a continuous operation of the endless conveyor is available. In other words, in contrast to the state of technology, where a start/stop operation of the endless conveyor occurs, the conveyor elements of the endless conveyor may circulate continuously.

If the circulation rate of the conveyor elements is halted at intervals at a setpoint approaching a constant determined by the control variable derived from the clip machine, the swinging movements of the sausage-shaped products can be minimized, which stabilizes the movement of the endless conveyor and lessens the mechanical wear and tear on the endless conveyor among other things.

A wide variety of values of the clip machine can be used for the control variable derived from the clip machine. Of particular advantage is when the control variable derived from the clip machine for the circulation rate of the conveyor elements is the feed rate of the suspension elements in the clip machine. The feed rate of the suspension elements provides the actual production timing for the manufacture of the sausage-shaped products in the clip machine, since a suspension element is fastened to each of the products. Even if a suspension element is attached to each second, third, etc. sausage-shaped product, which is basically possible when forming sausage pairs or sausage chains as disclosed herein, the feed rate for the suspension elements represents one of those variables that can be derived from the clip machine, which gives a good description of the actual production rate in the clip machine.

However, since the circulation rate of the conveyor elements is exposed to additional disturbances, such as disturbances that are the result of wear and tear occurring or of the swinging movements of the sausage-shaped products, which lead to fluctuations in the circulation rate of the conveyor elements, it is useful to superimpose some regulation on the control of the circulation rate.

The regulation can occur on the basis of various regulating and reference input variables. For example, it can be designed that, given the regulation superimposed on the control of the circulation rate, the time for reaching a takeover position in the feeding machine is regulated by the conveyor elements for the continuous takeover of sausage-shaped products. Thus it can be assured that a product is in the takeover or transfer position at the takeover time.

The actual regulation itself again can occur in different ways. Thus regulation of the circulation rate of the conveyor elements based on the deviation tendency of the interval of the conveyor elements from the predetermined position on the transport path of the conveyor elements can be carried out. For, by determining the deviation tendency, the influence of almost all disturbances on the circulation rate of the conveyor elements can be measured and corrected. With an increase in the deviation tendency the circulation rate of the conveyor elements is increased, and the circulation rate is reduced with a decrease in the deviation tendency.

Every suitable position along the transport path of the conveyor elements can be selected, even for the predetermined position. Since the takeover position of the conveyor elements, in which they take over a sausage-shaped product from the clip machine, is a clearly defined position, it may be useful, in addition, to select the takeover position of the conveyor elements in the feeding machine as the predetermined position for the takeover of sausage-shaped products flowing out of the clip machine. As a result, it can be assured that a conveyor element is in the takeover position at the takeover time.

The determination of the deviation tendency can occur again in the most varied ways. Thus, to determine the deviation tendency, the distance of a specific conveyor element from the predetermined position in a circulation along the transport paths can be compared with the distance of the specific conveyor elements from the predetermined position in a subsequent circulation. Alternatively, the distance of a specific conveyor element from the predetermined position in a circulation along the transport paths can be compared with the distance of the following conveyor element from the predetermined position in the same circulation to determine the deviation tendency. In both cases the development of the circulation rate of the conveyor elements can be measured very precisely, and, with the regulation, one can respond very quickly to changes accordingly.

Besides the machines already mentioned, more machines can be added to the disclosed production line. Thus, for example, a filling machine, preferably operated on a timed basis, can be arranged in the production line, upstream from the clip machine in the production line or arranged before the clip machine against the direction of production flow and preferably feeding the filling material to the wrapper material in the clip machine. This way it is possible to integrate it into the control of the entire production line, allowing a further improvement in process control to be achieved. In the process the filling machine can be operated continuously or discontinuously.

If the operation of the filling machine is halted for a disturbance in the operation of the feeding machine, an additional feed of filling material to the clip machine, arranged downstream, can be avoided, and a possible clogging of the clip machine can be prevented.

If a release signal applied to the filling machine is removed by the feeding machine to halt the filling machine, this can be switched off at the same time upon detecting a disturbance in the feeding machine.

It is useful, if, during a disturbance in the operation of the feeding machine, the operation of the clip machine is continued until the completion at least of the sausage-shaped products about to be clipped and the operation of the clip machine is halted upon completion. Then it is assured that no semi-finished product will be found in the clip machine when it is switched on again, which could trigger repeat disturbances immediately.

Furthermore, it is useful, if, during a disturbance in the operation of the feeding machine, the conveyor element, which is right in the takeover position of the feeding machine and taking over a sausage-shaped product from the clip machine, is removed from the takeover position before the operation of the continuously circulating conveyor elements is halted. During the next startup of the production line the takeover position of the feeding machine and the transfer position of the clip machine are vacant so that a product that is still in the delivery path of the clip machine can be conveyed into the transfer position.

Furthermore, it is advantageous, if the halting of the continuously circulating conveyor elements occurs before the conveyor element, which, in the takeover position, has just taken over a sausage-shaped product from the clip machine, has reached a storage rod being supplied. As a result, the storage rod is not blocked by the conveyor element and can be removed, if necessary.

Furthermore, a control device can be provided for the embodiment of the control or regulation that is in the position to control at least the circulation rate of the conveyor elements of the feeding machine, based on the control variables derived from the clip machine. In the process, the control device can also be used to control the operation of the feeding machine and the clip machine, which are coordinated with one another.

In particular, a production line for the manufacturing of sausage-shaped products is proposed, which receives a flowable filling material such as sausage meat, sealing material, granulate and the like in a tubular wrapper material, with the production line displaying at least: one clip machine, in which the wrapper material filled with filling material is divided into portions into individual sausage-shaped products by placing closing clips and separated from the supply to the remaining wrapper material, at least one flexible suspension element is applied to the sausage-shaped product during the placing of the closing clips, fed in a timed manner into the clip machine; and a feeding machine, which supplies or loads the storage rods individually for further processing of the sausage-shaped products and which has conveyor elements, circulating continuously along a transport path, which is used to supply the storage rods with sausage-shaped products and which takes the sausage-shaped products proceeding out of the clip machine into a takeover area provided between the clip machine and the feeding machine, where a control device is provided, which is in the position to control at least the circulation rate of the conveyor elements of the feeding machine, based on the control variables derived from the clip machine.

At the same time, it is useful if the control device is in the position to superimpose a regulation on the control of the circulation rate. Furthermore, it is useful if the control device is in the position to control the coordinated operation of the feeding machine and the clip machine.

In a preferred embodiment of the production line, the transport path between the clip machine and the feeding machine is interrupted, with the interruption of the transport path between clip machine and feeding machine being formed preferably by a takeover area, in which the transport path of the clip machine ends in a transfer position where the conveyor elements of the feeding machine, in a takeover position on the feeding machine side, take over the sausage-shaped products individually from the transfer position on the clip machine side.

Due to such an arrangement, the physical contact between the components of the production line is interrupted, preventing mechanical wear and tear. Moreover, no precise positioning of the clip machine is required as regards the feeding machine. For maintenance work to be done on one of the two machines, each of the machines can be taken out of the production line system then without the other machine having to be moved. The clip machine can pivot away, for example, to put on a new casing without the feeding machine having to be moved.

As already mentioned above, additional machines can be provided in the production line besides a clip machine and a feeding machine, for example, a filling machine for feeding filling material to the wrapper material in the clip machine, arranged upstream to the clip machine in the production line.

In particular, a clip machine is provided for a production line for the manufacture of sausage-shaped products, with the sausage-shaped products receiving a flowable filling material such as sausage meat, sealing material, granulate and the like in a tubular wrapper material. The clip machine itself contains at least two sealing tools for placing and closing clips on the sausage-shaped product, movable relative to one another between an opening and a closing position; at least one clip storage device from which clips can be fed to a sealing tool; a storage device for storing a supply of wrapper material; a separation device for separating an individual sausage product from the supply of wrapper material; a filling pipe for the feeding of filling material; a delivery device for delivering sausage-shaped products from the clip machine along a transport path for the sausage-shaped products; and a feeding device for flexible suspension during the placement of clips, with the transport path providing an initial transport path for the sausage-shaped products. Parallel to the transport path for the sausage-shaped products, a separate transport path is provided for the suspension elements connected to a sausage-shaped product.

As a result, the sausage-shaped products are conducted safely out of the clip machine and, the suspension elements can be optimally prepared for the transfer.

If the transport path for the sausage-shaped products and the transport path for the suspension elements connected to a sausage-shaped product end in a transfer position, where a sausage-shaped product can be kept ready in a defined manner for the transfer for further processing, then it is assured that, directly upon completion, the sausage-shaped products will arrive for transfer for further processing.

It is advisable to provide at least one transfer device at the transfer position for the transfer of the sausage-shaped products, which is shaped like a fork on its end facing away from the clip machine. As a result, an appropriately designed conveyor element can remove the sausage-shaped product from the transfer position without making contact, thus eliminating additional sources of disturbance.

If at least one sensor is provided at the transfer position that can detect the presence of a sausage-shaped product, continuous and disturbance-free operation can continue to be ensured.

In order to avoid damage to the suspension elements, the transport path for the suspension elements can be designed with a guide track having a suitable cross-section. In a preferred embodiment example, the guide track has a circular cross-section. Thus the suspension elements can easily slide along it without being damaged.

The guide track has preferably at least two bearing devices, each of which can be formed specifically by three support rollers preferably arranged evenly divided in the circumferential direction of the guide track, with the guide track being sufficiently and securely supported.

If the guide track is angled between the bearing devices, a sausage-shaped product can slide along on the angled portion of the guide track under its own weight. It is useful then if the angled section is in the vicinity of the bearing device near the feeding machine and if the track is sloped downwards. Moreover, this arrangement can prevent any occurrence of the guide track being rotated, if need be.

In order to facilitate the threading of the suspension element with the bearing devices, the guide track can be provided with a drivable hollow shaft in the area of the bearing device that is arranged coaxially to the guide track.

In an advantageous embodiment, the guide track is provided with a thread-shaped circumferential groove in the area of the bearing devices in order to make the passage of the suspension elements through the bearing devices possible. The thread-shaped circumferential groove can preferably be provided on the hollow shaft.

In a further preferred embodiment, the guide track has a corresponding convex surface in the area of the support rollers. As a result, in addition to the supporting of the guide track, an axial securing element is achieved.

It is useful, if at least one of the support rollers of each bearing device can be driven, since then the hollow shaft can be driven, and thus a forced guidance of the suspension elements by the bearing device is achieved.

If a threading cone is provided on the clip machine side end of the guide track, then the suspension elements of the sausage-shaped products can be guided safely with its assistance onto the guide track.

A catch device for the suspension elements, connecting to the clip machine side end of the guide track, which extends from the guide track into the closure area of the sealing tools, ensures that all caught suspension elements are guided securely to the guide track. In a preferred execution, the catch device is angled and possesses a cone-shaped catch point.

Furthermore, it is advantageous, if the suspension elements are formed by thread loops, since these are flexible and easy to handle.

In particular, a feeding machine for a production line is proposed for the manufacturing of sausage-shaped products, with the sausage-shaped products in a tubular wrapper material receiving a flowable filling material such as sausage meat, a sealing material, granulate and the like, with storage rods provided for suspending the sausage-shaped products, which have a flexible suspension element on one end, which can be guided over the storage rods and which can assume a closed or an open embodiment. Furthermore, the feeding machine contains a device for mounting an empty storage rod at the other end and a device for feeding the sausage-shaped products, suspended from their suspension elements, one after another, guiding the suspension elements over the free end of the storage rod and depositing the suspension elements at positions spaced from one another along the storage rod. The device for feeding one after the other can have an endless conveyor at the same time, with a strand running parallel to the storage rod. The endless conveyor has spaced conveyor elements to receive the suspension elements of the sausage-shaped products following one after the other. The conveyor elements are movable from a position holding the sausage-shaped products by their suspension elements to a position releasing and depositing the suspension elements on the storage rod. At least one control element at spaced intervals along the storage rod causes the movement of the conveyor elements into their depositing position. Furthermore, the conveyor elements have hooks that are pivotable around horizontal axes from their position holding the suspension elements. The control element is a trigger element moved along the strand of the endless conveyor against its forward direction, which triggers the swiveling of the hooks from their holding into their depositing position.

Such a construction makes it possible, in the presence of a sausage-shaped product in the transfer position, for this product to be removed from the transfer position from only one conveyor element and deposited in a predetermined position on a storage rod. In other words, from the pick-up by the conveyor element from the transfer position until its final deposit on a storage rod the product does not have to be transferred to any additional transport element. As a result, further sources of error are excluded, and the automation of this process is simplified.

It is useful if the hooks are comprised of two identical partial hooks, which, before reaching a takeover position from the feeding machine, in which the sausage-shaped products can be taken over by their suspension elements by the conveyor elements, are congruent with one another and, after leaving the takeover position are capable of spreading crosswise to the extension of the strand against a spring force into a position keeping the suspension elements open. Thus the products are removed safely from the transfer position. Due to the subsequent spreading of the hooks, the loop is opened so wide that they can be guided over the storage rod free from damage and without bumping.

An actuating body, arranged in the direction of the endless conveyor before the takeover position for the suspension elements, can move the hooks after the depositing of the sausage-shaped products on the storage rod back into their suspension element holding position. As a result, this ensures that the hooks are always in this position upon reaching the takeover position, and an undisturbed operation is assured.

In a preferred execution, the endless conveyor is a chain around a drive disc and a turn-around disc, with both discs rotatable around horizontal axes. Chains appear to be particularly suited since they run without slipping and do not stretch, as for example, belts do, so the distance between two conveyor elements always remains the same.

It is useful, if a supporting device is provided that, after the partial filling of a storage rod, can be pivoted in reverse on this device between its ends from a waiting position into a supporting position. Due to the filling of the storage rods mounted at one end, the storage rod bends downwards. However, if it is held by a supporting device, which, for example, engages in the center under the storage rod, an unreliable further bending is prevented, and the rod can continue to be filled securely.

In the process, it is practical if the supporting device can be moved into the supporting position by means of gravity and into the waiting position by means of a motor drive, since the addition of another drive can be spared as a result.

The assistance from the movement of the supporting device into the supporting position through an elastic pre-tensioning force, which is reproducible with the motor drive, increases the aforementioned effect.

If the motor drive of the supporting device can be driven by a drive of the feeding machine, then it is possible to adjust its movement to the rate of the filling machine, that is, moving it, for example, into the waiting position during the exchange of a filled storage rod.

In an advantageous execution, the movement of the supporting device from the waiting position into the supporting position can be triggered by a trigger element. As a result, it is possible to move the supporting device into the supporting position with an exactly pre-determined filling level.

Furthermore, it is useful if the supporting device has a locking device, which locks the supporting device reversibly in the waiting position, keeping it securely in the waiting position.

The movement of the supporting device can be guided along a continuous curved track, with the curved track demonstrating at least two discontinuities that define the waiting position and the supporting position.

A great variety of solutions can again be provided for mounting the storage rods. A device for fixing a storage rod at one end should be designed with preferably four fixation points or clamping units as part of a turret device. As disclosed herein, this turret device is rotatable at least into one mounting position, into a feeding position and into a delivery position. It can be useful if a testing position is provided between the mounting position and the feeding position, in which the presence of a storage rod is checked in a mounting unit and/or the straight direction of the storage rod. The latter is necessary since storage rods can be bent or incorrectly mounted, for example, which makes the threading of the sausage-shaped products on the storage rods difficult or impossible.

If the turret device has a motor drive, from which the movement of the supporting device from the supporting position into the waiting position can be driven, the movement of the supporting device can be controlled in an advantageous manner as a result.

In a preferred embodiment, a testing device is provided on the side of the feeding machine opposite the turret device, which measures at least the presence of a storage rod. In the process, it is useful if the testing device is in the position to detect the alignment of the storage rod in order to establish its correct axial alignment.

Furthermore, it is useful, if the testing device is in the position to remove an incorrectly positioned storage rod and/or a storage rod showing an incorrect alignment from the turret device, since an alignment of an incorrectly inserted rod would be too costly. In the process, the testing device can do this itself or have another device do it as well, for example, the mounting device.

The testing device can have quite a varied construction. A simple and reliable design is attained by having the storage rod in the mounting position be capable of moving its free end axially into a testing cup of the testing device in the testing position and being capable of being discarded if there is an impediment in the movement.

In a preferred embodiment, the conveyor elements can be guided past, parallel to the storage rods, to transfer the sausage-shaped products to the storage rods, with each depositing position on the storage rod being achievable for the sausage-shaped products.

If the partial hooks of a conveyor element are capable of being spread directly before reaching the storage rod, and preferably a particular, trapeze-shaped spreading bar is provided for spreading the partial hooks, then it is ensured that the loops will be opened far enough on reaching the storage rod that they can be guided over the storage rod.

Upon completion of a circulation of the conveyor elements, in order for sausage-shaped products to be picked up once again, it is useful if the spread partial hooks of the conveyor elements can be compressed together again upon reaching the end of the storage rod, and preferably the spread partial hooks of the conveyor elements can be compressed together again, for example, by means of a pre-tensioned spring.

If a release screw is provided as the release element that preferably can be guided on a spindle, upon reaching it, a conveyor element releases the sausage-shaped product for deposition onto the storage rod by folding the hooks together. Then the distance of two adjacent products can be set precisely. In the process the release screw can be guided against the movement direction of the conveyor elements so that uniform filling of the storage rod occurs. At the same time, the release screw is in the position to actuate a mechanism that causes the folding together of the hooks of the conveyor elements.

If the conveyor element right before reaching the takeover position passes a hook straightening element that straightens the folded hooks to release the sausage-shaped product, then it is ensured that a product in the transfer position can be taken over without a problem.

Furthermore, it is useful if the conveyor element has a catch device that secures the hooks of the conveyor elements in the folded position as well as a catch device that secures the hooks of the conveyor elements in the straightened position as needed. As a result, the secure pickup and deposition of the sausage-shaped products are ensured and disturbances avoided.

A feeding device for the storage rods can be provided that feeds the storage rods in coordination with the work cycle of the feeding machine so that they can be fed accordingly as needed.

A complicated pivoting of the rods is avoided, if the feeding device is in the position to feed the storage rods axis-parallel to the clamping device of the turret device and the storage rods are placed in the feeding machine coaxially to the clamping device.

In an advantageous execution, the feeding device has at least two rigid support elements, provided with even divisions, on which a supply of storage rods is deposited axis-parallel to the filling direction, which storage rods can be transported into the feeding machine preferably by at least two discharging rods, provided with even divisions, through an intermittent movement.

If the intermittent movement can be generated by an eccentric, the transport rate can be regulated via the rotational speed of the eccentric. At the same time, it is useful that at least one eccentric can be driven by a belt drive, which can be derived from the drive of the turret device, since the transport rate of the rods can then be adapted to the production rate of the sausage-shaped products.

Furthermore, it is useful for the weight and quality check, if a weighing device for the sausage-shaped products is provided in the area of the takeover position, which selectively measures the weight of an individual sausage-shaped product. At the same time, the weighing device can have a weighing lever free to pivot into the movement path of the conveyor element, to which a sausage-shaped product to be weighed can be transferred by the conveyor element.

Additional advantageous embodiments as well as an example of an execution of the invention will be explained in greater detail in the following, in connection with the description of an embodiment, in association with the enclosed figural drawings. The concepts of 'above', 'below', 'left' and 'right' used during the description of the example of an execution refer to the drawings in an orientation with normal, readable reference numbers and figural designations.

BRIEF DESCRIPTION OF THE DRAWINGS

FIG. 2 is a side view of a new feeding machine with a delivery path for sausage-shaped products from a new machine;

FIGS. 2a and 2b are schematic representations of a transfer position from a clip machine to a feeding machine in the production line reproduced in FIG. 1, in an overhead view and a side view, respectively;

DETAILED DESCRIPTION

Figure 1:
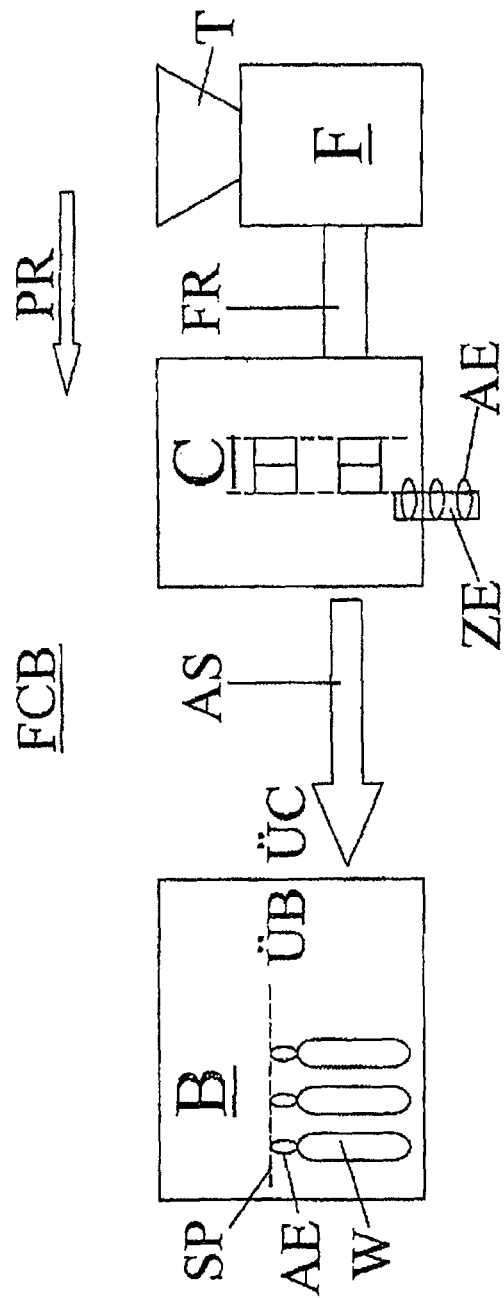
FIG. 1 is a schematic overview representation of a new production line.

In FIG. 1 a production line FCB represented schematically in its basic construction is shown. This construction will be explained in its basic structures in the following.

The production line FCB as disclosed herein serves the manufacturing of sausage-shaped products or sausage products W. Of course, the production line FCB can be used for the manufacture of other sausage-shaped products W, for example, sausage-shaped individually sealed into separate portions and the like. The production line FCB can process any flowable filling material, i.e., thus also granulate, fluids, etc. that can be filled into a wrapper material and divided into portions as a sausage-shaped product.

As can be gathered from FIG. 1, the production line FCB is comprised of a filling machine F, a clip machine C and a feeding machine B, which, corresponding to the production flow direction PR of the production line FCB, are arranged one after the other, in keeping with their function in this particular sequence. Filling material, sausage meat here, is fed from the filling machine F to a filling hopper T, discontinuously or continuously, by means of suitable conveying device, for example, a feed pump, to the clip machine C. In the clip machine C the sausage meat is filled into wrapper material, also not represented in greater detail in FIG. 1, and divided into portions into individual sausage products W. Then the sausage product W, manufactured this way, is delivered from the clip machine C via a delivery path AS of the clip machine C to a transfer position ÜC. From the transfer position ÜC a conveyor element, not represented in greater detail in FIG. 1, of an endless conveyor of feeding machine B takes over the sausage product W in a takeover position ÜB. In the feeding machine B the individual sausage products W are threaded onto individual storage rods SP one after the other, but threaded on at spaced intervals between one another. Then the storage rods SP can be removed from the feeding machine B for further processing of the sausage products W and fed, for example, to a smoking oven and the like.

The clip machine C has a filling pipe FR for feeding the filling material from the filling machine F and is linked via this to the filling machine F. At the same time, the filling pipe FR can also serve as a repository for the supply of wrapper material that is processed in the clip machine C. In addition, the clip machine C has a feeding device ZE for flexible suspension elements AE, preferably a conveyor belt. The suspension elements AE, formed preferably by thread loops, are on a support belt, coated on one side with an adhesive, from which they are removed individually by a die of a clip placing and clip closing tool, not depicted in greater detail, in the clip machine C. As can be gathered from FIG. 1, the feeding device ZE for the suspension elements AE is arranged on the clip machine C in the area of the clip placing and clip closing tools so that their direction of travel runs approximately perpendicular to the production flow direction PR in the production line FCB.

In the clip machine C, the tubular wrapper material is filled with the sausage meat and divided into portions into sausage products by closing clips placed at appropriate positions. In the process, a flexible suspension element AE, which was inserted by the feeding device ZE into the clip placing and clip closing tool of the clip machine C, is fastened at the same time to an end of each sausage-shaped product W. Then the finished sausage product W is carried out onto the delivery path AS from the clip machine C. The delivery path AS of the clip machine C ends in the transfer position ÜC, where the sausage products W are taken over individually by the conveyor elements, not represented in greater detail in FIG. 1, in a takeover position ÜB from the feeding machine B and fed to the storage rods SP. The transfer position ÜC at the end of the delivery path AS of the clip machine C and the takeover position ÜB of the feeding machine B together form a takeover area ÜB, ÜC, where the conveyor elements take over a sausage product W that is in the transfer position ÜC of the clip machine C.

It should be noted that, besides the procedure described above of applying a suspension element AE to each sausage product W, the option exists of applying a suspension element AE to every second, third, etc. sausage product W, with the wrapper material not being separated between the first, second, third, etc. sausage product W. As a result, pairs or chains of sausage products W can be formed.

In the production flow direction PR of the production line FCB, the feeding machine B connects to the clip machine C. As already mentioned before, the storage rods SP may be kept ready in the former in an axis-parallel alignment to the production flow direction PR of the production line FCB, i.e., in a horizontal alignment in FIG. 1 for depositing the sausage products W. In the process, the storage rods SP are fed or loaded with the sausage products W, with the sausage products W having an interval between one another that remains approximately the same, selected preferably so that the exteriors of the sausage products W do not touch. The attainment of the intervals can be set through suitable means, which will be explained in greater detail in the following.

In the following the construction of the clip machine C, in particular, its delivery path AS, will be explained in greater detail with reference to FIGS. 2 to 4.

In FIG. 2 feeding machine B is represented with the upstream delivery path AS of the clip machine C. The takeover area ÜC/ÜB, which is formed by the transfer position ÜC of the clip machine C and the takeover position ÜB of the feeding machine B, is provided at the interface between the end of the delivery path AS of the clip machine C and the feeding machine B, as has already been mentioned. To the right of the delivery path AS is the clip machine C, which is not represented in greater detail in FIG. 2.

The delivery path AS of the clip machine C has as its integral components a conveyor belt 110, a guide track 130 and two bearing devices 140 bearing the guide track 130. The conveyor belt 110 serves the transport of the sausage products W that lie on the conveyor belt 110 in a horizontal alignment, with the sausage ends facing the feeding machine B or the clip machine C. Moreover, the guide track 130 is provided to guide the suspension elements AE of a sausage products W transported by the conveyor belt 110.

Figure 3:
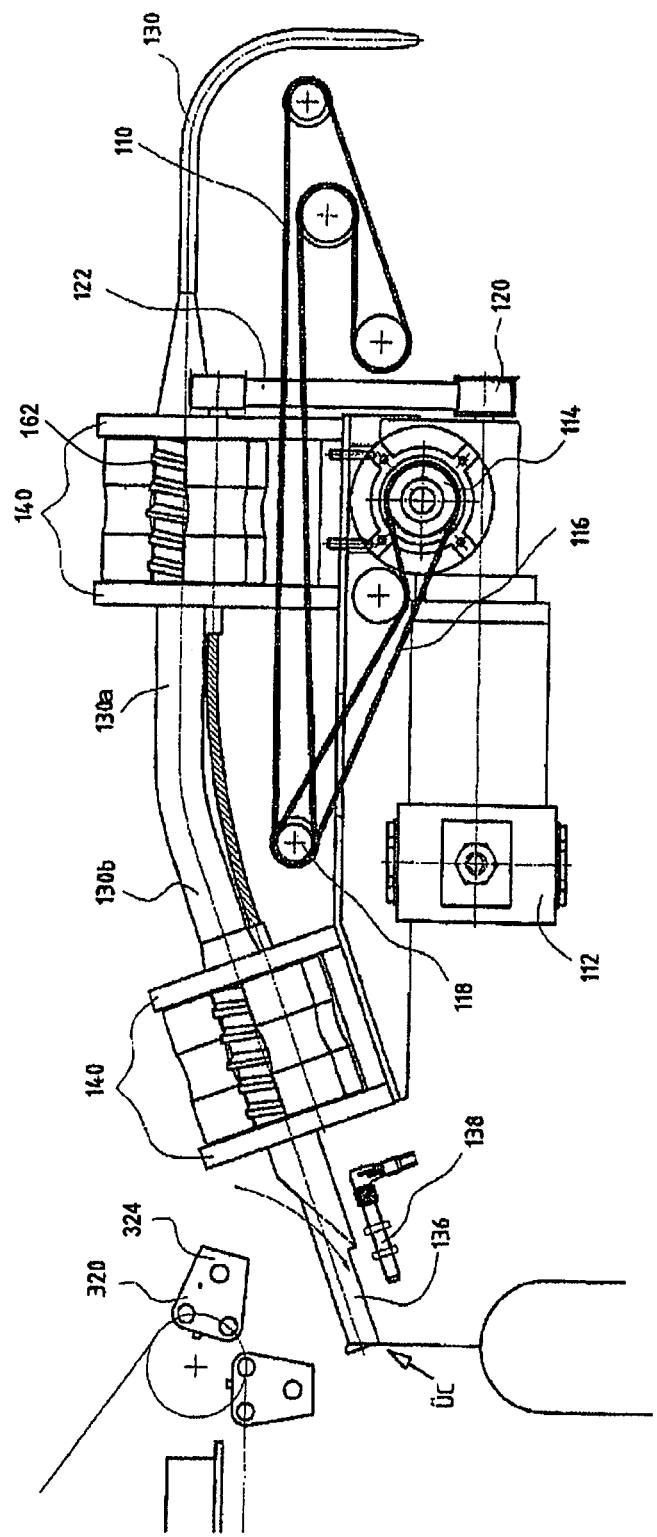
FIG. 3 is a partially sectioned side view of the delivery path for the sausage-shaped products from the clip machine shown in FIG. 2.

The conveyor belt 110, which extends from the clip placing and clip closing tools of the clip machine C into the vicinity of the second bearing device 140, is driven via a drive motor 112 provided beneath the conveyor belt 110 (cf. FIG. 3). Via a gear, not described in greater detail, the drive motor 112 drives a belt pulley 114, over which a belt 116 is looped for the direct drive of the conveyor belt 110. The belt 116 is also looped around a deflection roller 118 of the conveyor belt 110, arranged to the left in FIG. 3, which simultaneously serves as the drive roller for the conveyor belt 110. The conveyor belt 110 is deflected, furthermore, via several cylinders not described in greater detail, whose axes run, deflected, perpendicularly to the transport direction of the conveyor belt 110; thus the distance between the conveyor belt and the sealing tools can be changed.

From the drive motor 112, furthermore, a driving force for the guide track 130 is derived directly from the motor shaft. Referring to FIG. 3, from an angular gear 120, arranged beneath the conveyor belt 110 and the guide track 130, a drive belt 122, running vertically upwards, extends in the direction of the guide track 130, serving as the rotary drive for the guide track 130 in the area of the bearing devices 140 in a manner to be described in the following.

Figure 4:
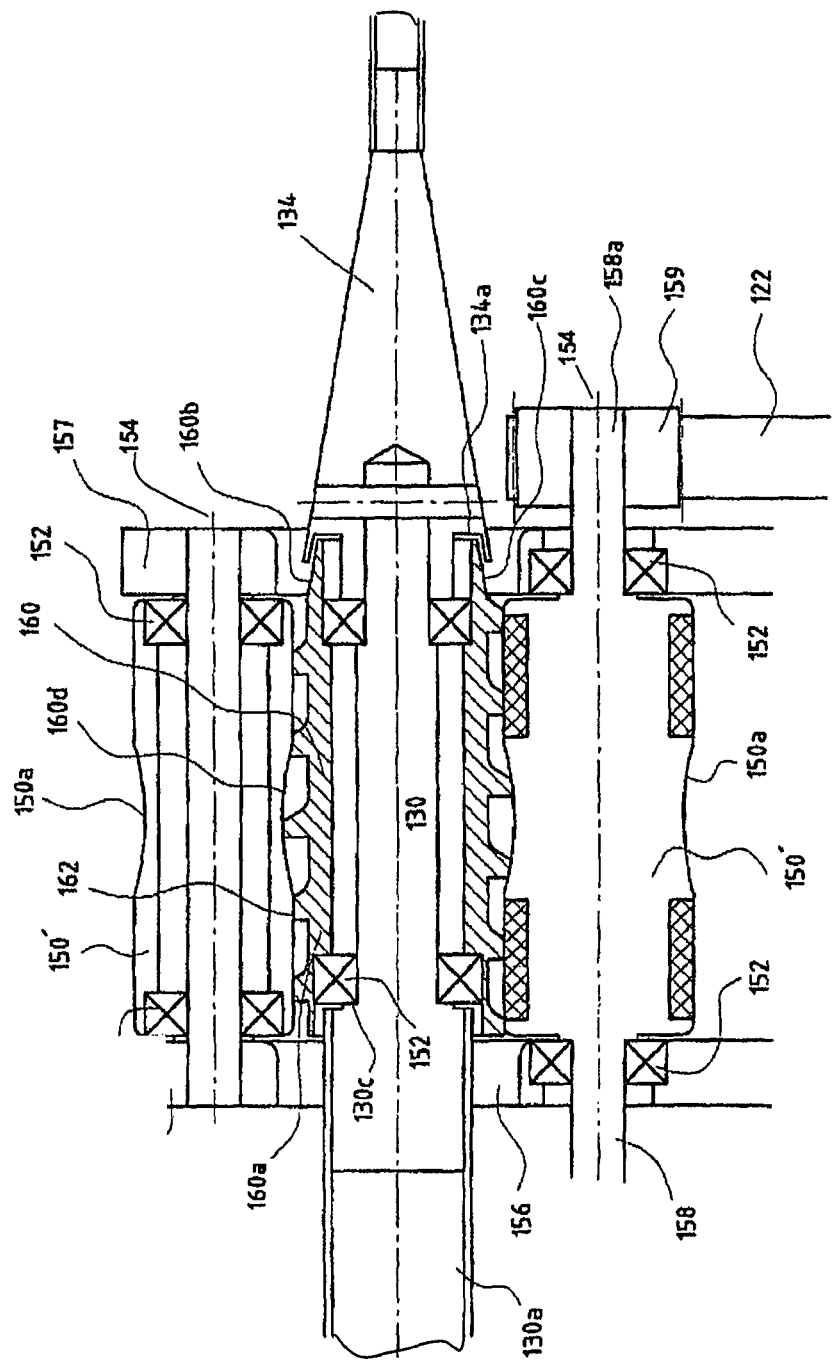
FIG. 4 is a schematic representation of a bearing device of a guide track in the delivery path of the clip machine shown in FIGS. 2 and 3.

The guide track 130 is arranged above the conveyor belt 110 and comprises a guide track section 130a running horizontally, which, with reference to FIGS. 2 to 4, extends from the clip machine C to the left as well as a guide track section 130b, connecting to the left end of the horizontally running guide track section 130a and running from this guide track section 130a to the right down an incline or a slope. Due to the bending of the guide track 130, the sausage product W, after leaving the conveyor belt 110 moves independently under its own weight into the transfer position ÜC. In both sections 130a, 130b the guide track 130 may have a cross-section that is approximately circular.

As can be gathered, in particular from FIGS. 2 and 4, the guide track 130 at its clip machine side end is provided with a threading cone 134 for threading the suspension elements AE. The threading cone 134 forms a part of a catch device, not described in greater detail, which extends to the closure area of the clip placing and clip closing tools of clip machine C, assuring a secure threading of the suspension elements AE formed by the thread loops. The threading cone 134 is aligned coaxially to the guide track 130 and points away from it with its tip. The threading cone 134 has a sharp cone angle, facilitating the guiding of a suspension element AE. On its end pointing to the guide track 130 the threading cone 134 is provided with an annular, circumferential recess 134a.

At its feeding machine end of the guide track 130 a fork-shaped transfer device 136 is attached to the guide track 130, which defines the transfer position ÜC of the clip machine C. As is apparent from FIGS. 2a and 2b, the two tines 136a of the fork-shaped transfer device 136 are at least approximately in a horizontal plane. The ends of the tines 136a are bent upwards so that a sausage product W sliding down the guide track 130 remains suspended from them and securely occupies the transfer position ÜC; at the same time, however, a sausage product W can be picked up from the fork-shaped transfer device 136 by means of a conveyor element of the feeding machine B, described in greater detail in the following.

In the vicinity of the fork-shaped transfer device 136 a sensor 138 is attached, which detects the presence of a sausage product W.

For the transfer of the sausage products W from the delivery path AS of the clip machine C to the feeding machine B, the products W lie or are suspended at the end of the delivery path AS in the transfer position ÜC, ready to be picked up there by the conveyor element of the feeding machine B, described in greater detail in the following. In the process, the fork-shaped transfer device 136 expands the suspension element AE in such a manner that a section of the suspension element AE runs tautly over the two tines 136a of the fork-shaped transfer device 136 in a direction perpendicular to the production flow direction PR of the production line FCB. This section is then detected by the conveyor element of the feeding machine B in the manner described in the following.

The two bearing devices 140 bearing the guide track 130 are each built the same so that in the following only one of the two bearing devices 140, the bearing device 140 on the clip machine side, will be explained in greater detail in connection with FIG. 4, in which it is presented in a side view. The bearing device 140 is comprised of three support rollers 150, which in the circumferential direction of the guide track 130 are arranged around it evenly divided, with only two (150', 150") of the three support rollers 150 being visible in the representation of FIG. 4. The upper support roller 150' of the visible two support rollers 150 represented in FIG. 4 is mounted on ball bearings 152 freely rotatable around an axis 154. The axis 154 is mounted on two support walls 156, 157, provided at each of the two front-facing ends of the axis 154, which again are supported on the frame of the clip machine C.

The second, lower support roller 150", visible in FIG. 4, is connected to a shaft 158 that is torsion-proof and, together with this shaft, capable of rotating, is mounted to the support walls 156, 157 in ball bearings 152. The left end of shaft 158 continues parallel to the course of the guide track 130 in a flexible shaft 151, as can be seen in FIG. 2, and serves as the drive for the corresponding support roller 150" in the bearing device 140 next to the feeding machine.

Furthermore, as shown in FIG. 4, the right front end of the shaft 158, which forms a shaft extension 158a, extends past the right support wall 157. This shaft extension 158a stands above a bevel or worm gear 159, rotatably engaged with the drive belt 122, which drives the lower support roller 150". Furthermore, the lower support roller 150" has a slightly larger external diameter than the upper support roller 150'.

It should be noted that the support roller 150, not visible in FIG. 4, which, with reference to FIG. 4, is behind the lower, driven support roller 150", is also built the same as the upper support roller 150' described previously.

The guide track 130 is provided with a hollow shaft 160, freely rotatable relative to the guide track 130, in the area of the support rollers 150, which are coaxial to the guide track 130 and are pushed on to the guide track. The hollow shaft 160 is mounted on the ball bearings 152, which are pushed onto the rigid guide track 130 and supported by it. The left front-facing shaft end 160a of the hollow shaft 160 concludes with the left front-facing ends of the support rollers 150. The hollow shaft 160 projects over a ledge 130c on the rigid guide track 130, which forms an axial support for the left ball bearing 152, and covers this ledge 130c. As is apparent from FIG. 4, the right front-facing end 160b of the hollow shaft 160 projects over the right ends of the support rollers 150. This right front-facing end 160b of the hollow shaft 160 has an incline 160c to the guide track 130, with which the hollow shaft 160 engages the annular recess 134a of the connecting threading cone 134.

Furthermore, as is apparent from FIG. 4, the support rollers 150 have a concave surface contour 150a in their axial center on their external circumferential surface and the hollow shaft 160 a corresponding convex surface contour 160d in their axial center on their external circumferential surface, with which the axial bearing of the hollow shaft 160 is supported. The hollow shaft 160 and the support rollers 150 touch in a surface line, through which the hollow shaft 160 can be driven via the drivable lower support roller 150" that can also be driven. One can see from this that the guide track 130 can rotate only in the area of the hollow shaft 160 within the two bearing devices 140; the other components are rigid and fixed in place.

In addition, the hollow shaft 160 has a thread-shaped circumferential groove 162 on its surface. This makes the passage of the suspension elements AE, captured by the threading cone 134, through the bearing devices 140 possible. By turning the hollow shaft 160 the thread-shaped circumferential groove 162 assumes a transport function for the suspension elements AE. The groove 162 is designed so the suspension elements AE are transported in the direction of the feeding machine B.

Due to the design of the bearing devices 140 explained before, a secure support of the guide track 130 is achieved, without hindering the transport of the sausage products W on the transport belt 110 along the guide track 130. Furthermore, the angled section 130b of the guide track 130 enables a sausage product W to slide by virtue of its own weight along the angled section 130b of the guide track 130 into the transfer position ÜC, without a separate drive being necessary for this. In addition, the arrangement of the two bearing devices 140 in an angle prevents the guide track 130 from rotating unintentionally.

It should be noted that the two gears, driven by the drive motor 112, are so coordinated with one another that the sausage product W being transported by the conveyor belt 110 and the associated suspension element AE can be conveyed steadily along the delivery path AS. The sausage product W, sliding along and held by its suspension element AE on the guide track 130, can slide securely and without any great oscillating movement along the guide track 130, as explained in greater detail in the following, from the conveyor belt 110 at the end of the transport path of the conveyor belt into the transfer position ÜC.

In the following, the feeding machine B will be explained in greater detail, making reference to FIG. 2 and FIGS. 5 to 12. The feeding machine B has as its integral components a conveyor device 300, a turret device 400, a support device 500, a supply device 600 for the storage rods SP, a testing device 700 for the storage rods SP as well as a weighing device 800 for the sausage products W.

The conveyor device 300 has an endless conveyor 310 essentially aligned horizontally, which, in this example, is formed by two endless chains 310a, 310b, extending parallel in horizontal planes as much as possible but at a distance from one another. These circulate around two pinion gears 312, arranged in pairs at the right end of the endless conveyor 310 in FIG. 6, and two pinion gears 314, arranged in pairs as well as driven on the left end of the endless conveyor 310 in FIG. 6 (compare also FIG. 7). Both endless chains 310a, 310b of the endless conveyor 310 circulate continuously during operation, i.e., a start/stop operation of the endless conveyor 310 does not occur, as presented in the state of technology at the beginning. The axes of the pinion pairs 312, 314 are also horizontal, but aligned perpendicularly to the endless chains 310a, 310b of the endless conveyor 310. The circulation direction of the endless chains 310a, 310b is such that the conveyor elements 320, explained in greater detail in the following, on the upper strand of the endless conveyor 310 are moved against the production flow direction PR for manufacturing the sausage products W to the takeover position ÜB. In the lower strand, they move away from the takeover position ÜB in the production flow direction PR.

The conveyor elements 320 are spaced evenly along the endless conveyor 310, fixed but removable. The conveyor elements 320 are attached firmly to the endless chains 310a, 310b by means of two fixing rods 322 extending crosswise to the endless chains 310a, 310b and arranged in a common horizontal plane. Two identically constructed, triangular bearing walls 324 are arranged on the fixing rods 322 in the space between the endless chains 310a, 310b, at least one of which can be moved axially along the fixing rods 322. An axis of rotation 326 is mounted on the point of the triangle of the bearing walls 324, pointing above or below, of the endless chains 310a, 310b, depending on the position along the transport path of the endless conveyor 310. Two congruently designed partial hooks 328, capable of rotating, are arranged on the axis of rotation 326 in the space between the bearing walls 324, i.e., between the inner sides of the bearing walls 324 facing one another.

The partial hooks 328 can assume two different positions: a position holding the sausage products W, in which they point vertically below with their hook bow, not described in greater detail, in a direction perpendicular to that of the horizontal plane extending from the two endless chains 310a, 310b, and a standby position, in which they are folded downwards, approaching 90°, against the direction of conveyance of the endless conveyor 310. The partial hooks assume the position holding the sausage products W, as will be explained in greater detail in the following, during the transport of the sausage products W along the lower strand of the endless conveyor 310 until the deposition of the sausage products W on a storage rod SP. Movement to the standby position causes the deposition of the sausage products W onto a storage rod SP, as will also be explained in greater detail in the following. In the standby position the partial hooks 328 are pre-tensioned by at least one elastic pre-tensioned element, also not described in greater detail.

At least one of the bearing walls 324 together with the associated partial hooks 328, can be displaced axially along the fixing rods 322 and the axis of rotation 326. Preferably both bearing walls 324 together with the respective associated partial hooks 328 can be displaced axially along the fixing rods 322 and the axis of rotation 326, where they assume a compressed position, in which they are arranged between the endless chains 310a, 310b, at least approaching the middle of the rods 322 or the axis of rotation 326, and a separated or spread position, in which the bearing walls 324 abut the inner sides of the endless chains 310a, 310b with their external sides and the partial hooks 328 adjacent the inner sides of the bearing walls 324. Furthermore, a tension spring, not described in greater detail, can be provided, which moves the bearing walls 324 and the partial hooks 328, pre-tensioned, into the compressed position.

At the point of the triangle of the bearing walls 324 opposite the base of the conveyor elements 320, bearing and guide rollers 330 capable of rotating are arranged, depending on the position of a conveyor element 320 along the transport path of the endless conveyor 310, pointing above or below, which causes the axial movement of the bearing walls 324 or the partial hooks 328 by engaging with corresponding guide tracks. In the process, the bearing and guide rollers 330 can cause not only both movements, i.e., the compression and the separation movements, but also forcibly cause only the separation movement against the action of the tension spring. Of course, the combination of a tension spring and both forcible movements is also possible.

A trapeze-shaped spreading bar 332 is provided on the side of the conveyor device 300 pointing downwards along the guide track for the forcible guidance of the bearing and guide rollers 330. The spreading bar 332 extends in the horizontal space between the two pinion pairs 312, 314. The spreading bar 332 is provided with a triangular section 332a on its right and left front-facing ends. On the sloping external edges of the two triangular sections 332a of the spreading bar 332 as well as the spreading bar 332 itself a guide track 332b is provided for each, along which the bearing and guide rollers 330 run. Upon reaching the right triangular section 332a of the spreading bar 332, the bearing and guide rollers 330 engage the guide track 332b and thus are pushed apart. As a result, the bearing walls 324 connected to the guide rollers 330 are also forcibly pushed from the compressed position into the separated position and kept in this position until the conveyor elements 320 reach the left triangular section 332a of the spreading bar 332.

Besides their guidance function, the bearing and guide rollers 330 serve to carry the conveyor elements 320 loaded with sausage products W during their path along the lower strand of the endless conveyor 310. As a result, sagging of the endless conveyor chains 310a, 310b is avoided. This is attained through an alignment of the bearing and guide rollers 330 corresponding to the incline of the guide track 332b (cf. FIG. 7).

Various elements are provided for the execution of the rotational or pivoting movement of the partial hooks 328, which will be explained in the following, in particular, with reference to FIGS. 6 and 7. It should be noted that FIG. 7 represents the inner side of the conveyor elements 320.

Figure 7:
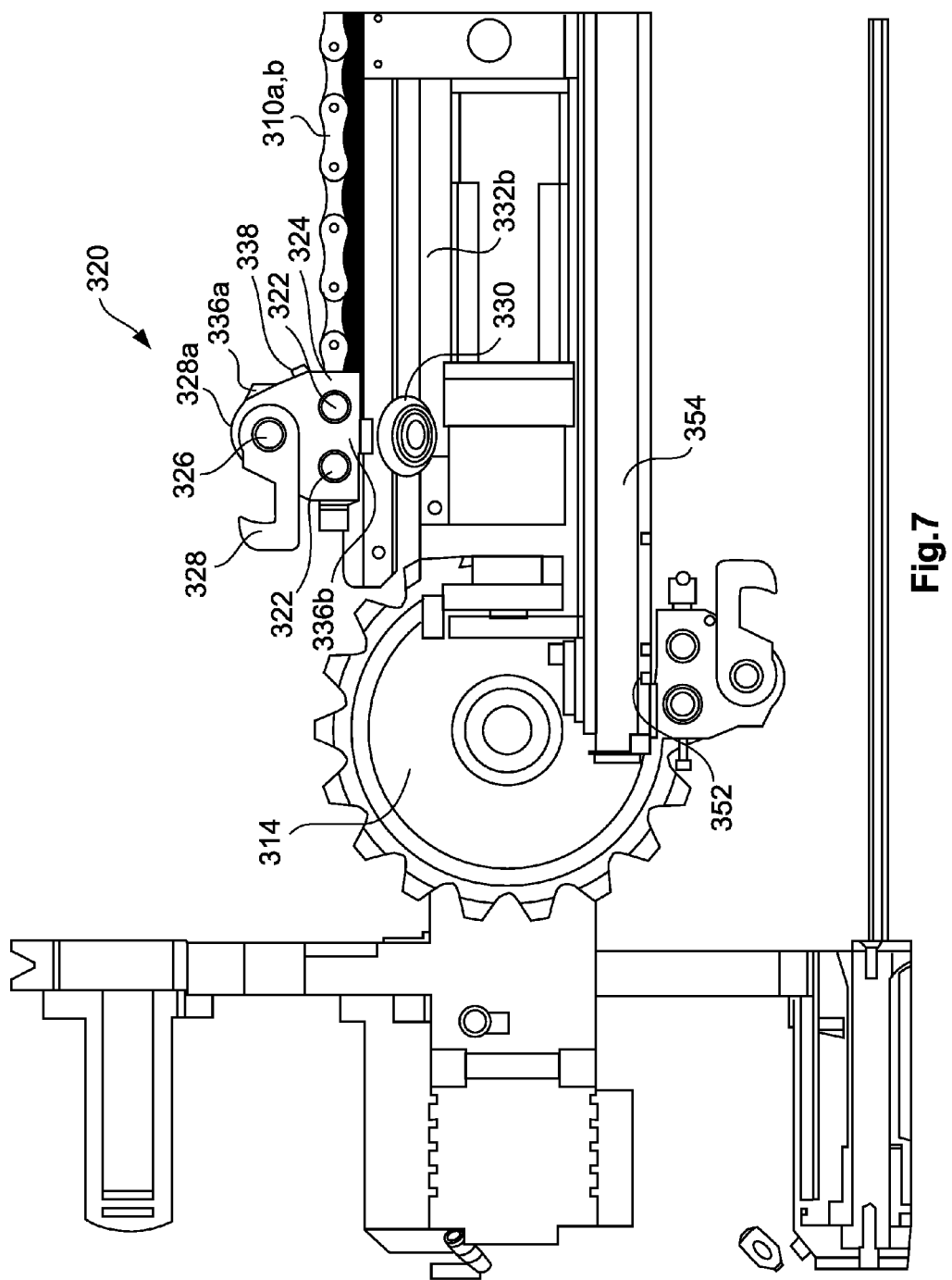
FIG. 7 is a schematic view of the turret side end of the endless conveyor shown in FIG. 6.
Figure 8:
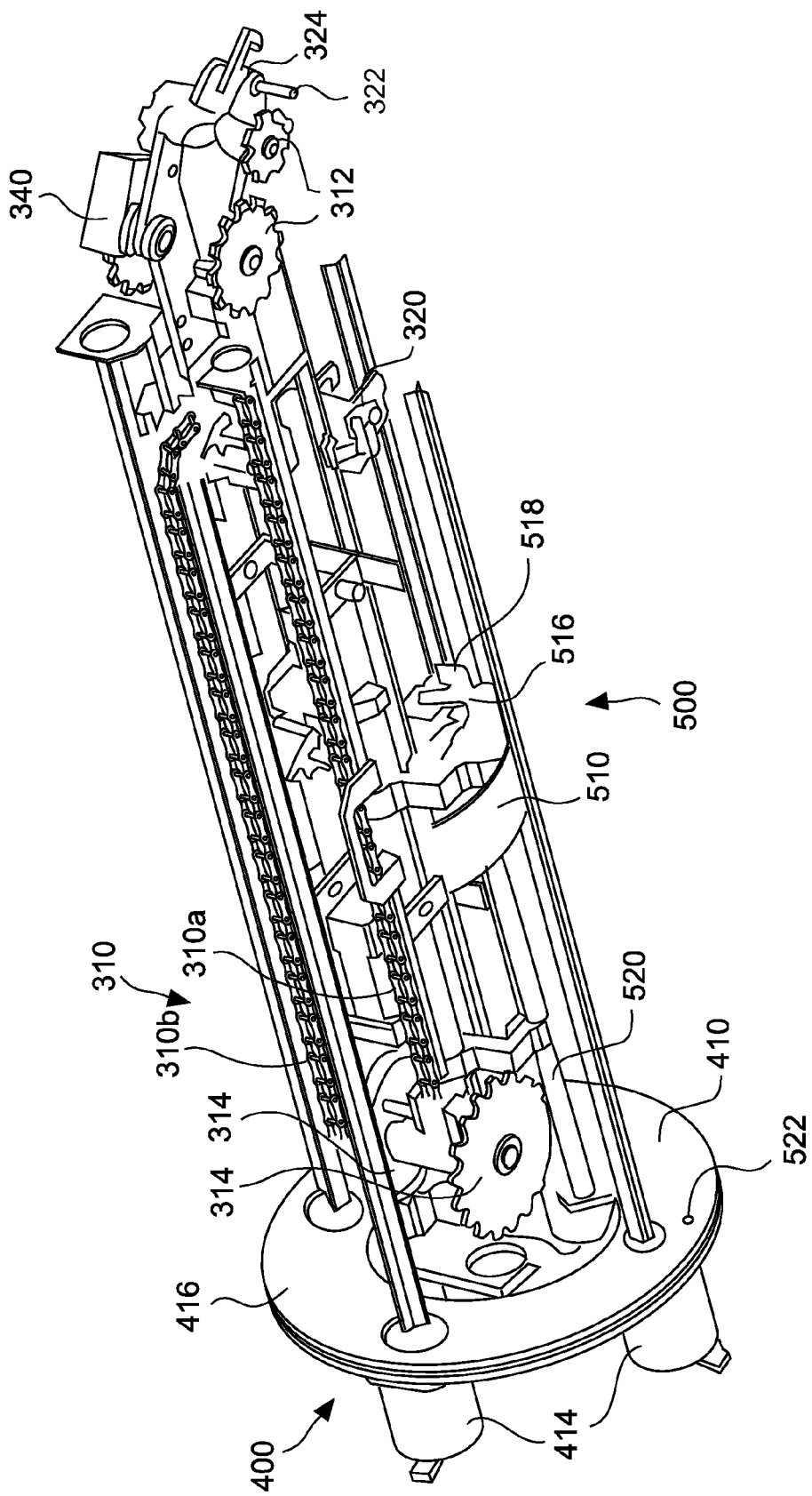
FIG. 8 is a schematic, perspective view of the endless conveyor and the turret device of the feeding machine shown in FIG. 2 in a view from above.
Figure 9:
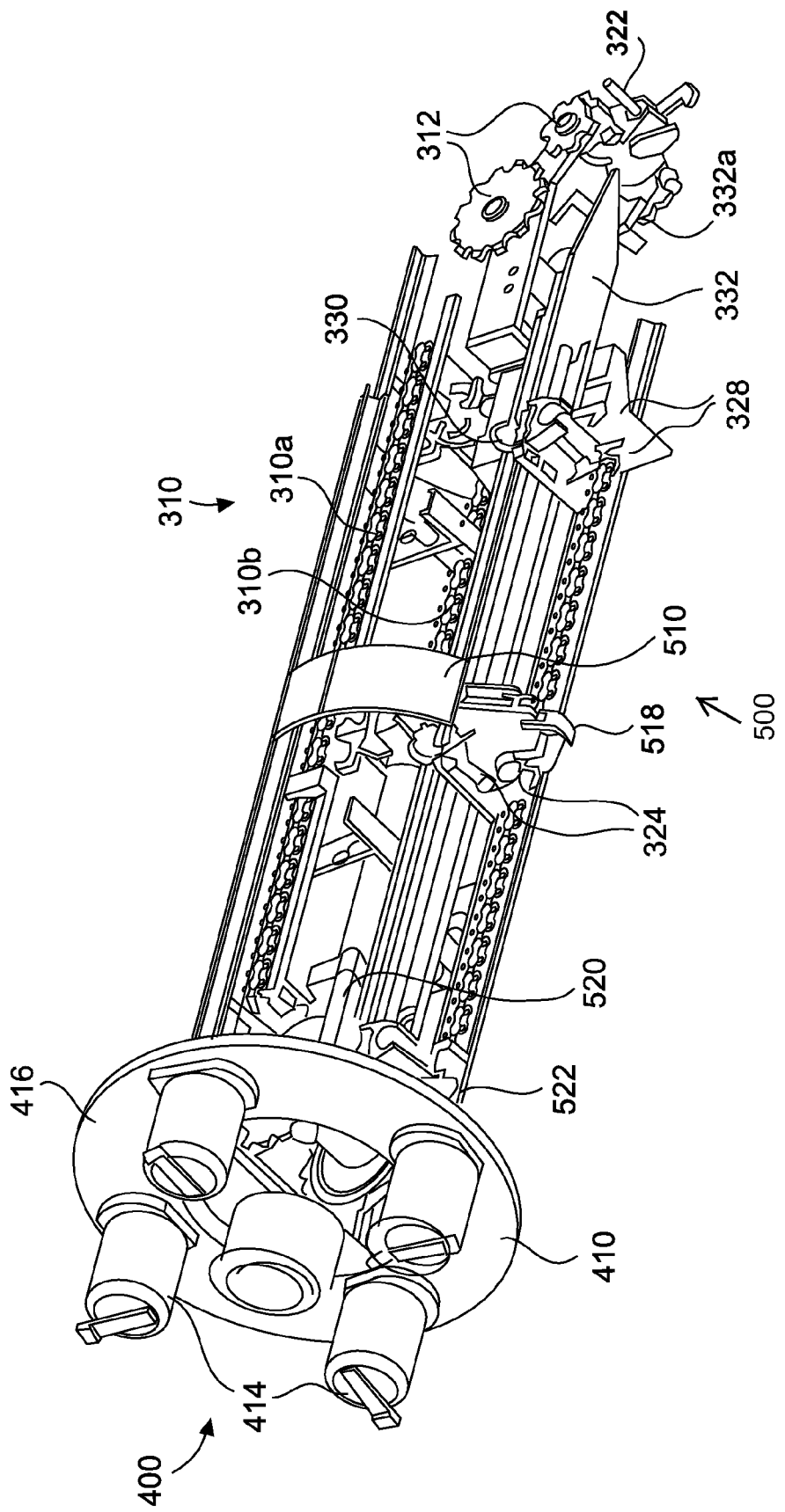
FIG. 9 is a schematic, perspective view of the turret device of the feeding machine shown in FIG. 2 in a view from below and in the direction of the clip machine.
Figure 10:
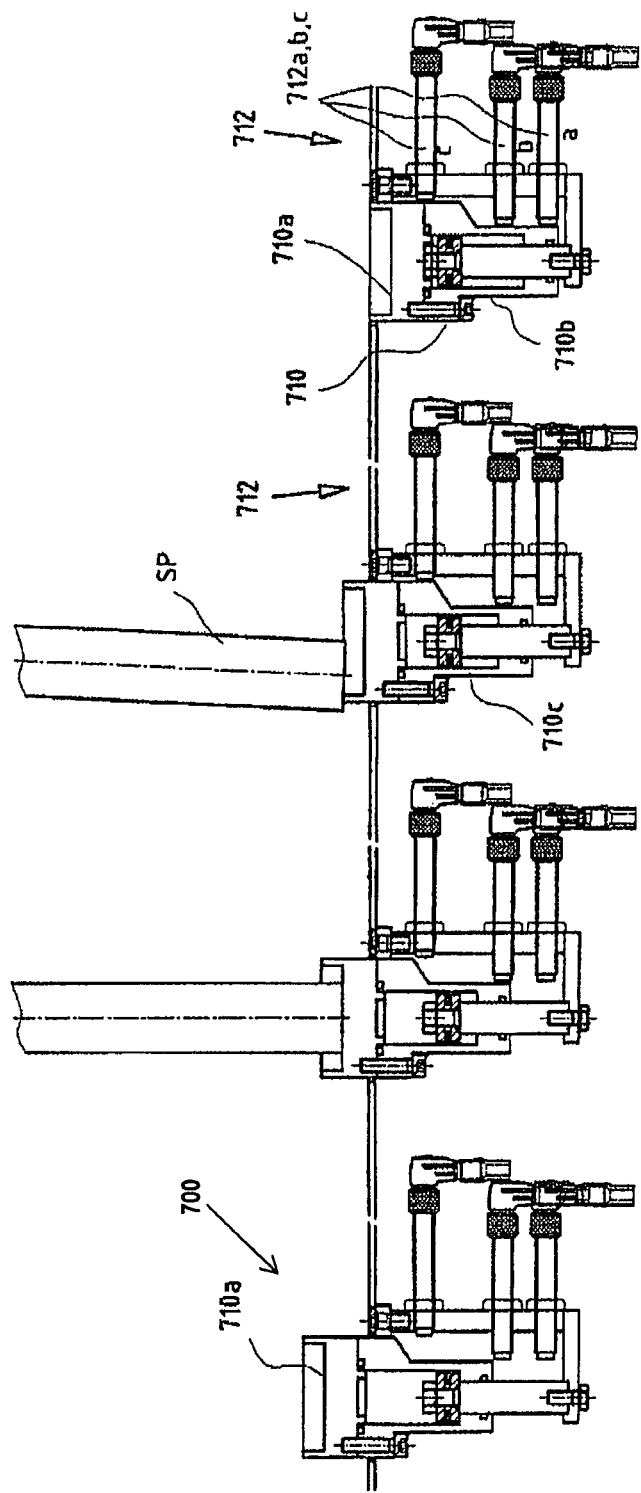
FIGS. 10a to 10d are schematic views of a testing device shown in various positions.

The partial hook 328 of a conveyor element 320, represented in FIG. 7 in detail, has a locking recess 328a which is arranged on its external circumferential surface in the area of its axis of rotation 326 and, as is apparent in FIG. 7, which points to its hook tip, not described in greater detail. Furthermore, on the bearing wall 324 of the conveyor elements 320, a blocking pawl element 336 with a blocking pawl 336a is arranged on the fixing rod 322 of the conveyor elements 320, capable of pivoting and pointing in the direction of conveyance. The blocking pawl 336a, arriving in the position of the partial hooks 328 holding the sausage products W, engages reversibly with the recess 328a and locks the particular partial hook 328 in this position. The blocking pawl element 336 is pushed into this locking position by a leaf spring 338 provided on the respective bearing wall 324.

In order to trigger this locking, the blocking pawl element 336 is provided with a trigger nose 336b on the end opposite the blocking pawl 336a, which is actuated by a release unit 350, explained in greater detail in the following. Upon release, the blocking pawl element 336 is pivoted clockwise so that the blocking pawl 336a disengages from the recess 328a of the partial hooks 328. Due to the action of the aforementioned elastic pre-tensioned element, the specific partial hook 328 is pivoted or folded back then into the standby position. In order to become upright again a hook straightening element 340 is provided in the area of the right, driveless pinion pair 312 on the endless conveyor 310. This hook straightening element 340 is arranged on the endless conveyor 310 so that the partial hooks 328 of a conveyor elements 320 are straightened once again by a rod, traveling against a curved track of the straightening element 340, before reaching the takeover position ÜB.

The conveyor device 300 has, furthermore, a release unit 350. This contains a release screw 352 forming a control element, which can be displaced back and forth along a horizontally aligned rotary spindle 354. The rotary spindle 354, as can be gathered specifically from FIG. 6, is arranged in the area of the spreading bar 332 between the two forcible guide tracks 332b of the spreading bar 332. The release screw 352 can be displaced in reverse along the rotary spindle 354 from the left triangular section 332a of the spreading bar 332 to the right triangular section 332a of the spreading bar 332. As mentioned already, the release screw 352 allows the partial hooks 328 of the conveyor elements 320, during the contact of the trigger nose 336b of the blocking pawl 336 with the release screw 352, to go from their position holding a sausage product W into the pivoted, folded, standby position to the rear.

A turret device 400 is arranged on the end of the feeding machine B to the rear, i.e., on the left end of machine B with reference to FIG. 2. Its principal component, approaching circular in shape in the overhead view, is a tool disc 410 which, with reference to FIG. 2, is aligned vertically, with its center axis running coaxially with an imaginary central longitudinal axis of the endless conveyor 310. On the tool disc 410 there are four pocket- or pot-shaped clamping units 414 attached, uniformly arranged in a circumferential direction, on the side pointing away from the endless conveyor 310, near the outer circumference in axis-parallel alignment to the center axis. One end of a storage rod SP can be clamped in these so they point with their free end in the direction of the clip machine C. As is apparent from FIG. 9, the clamping units 414 are arranged on one side of the tool disc 410, pointing away from the endless conveyor 310.

A ring gear 416 is provided on the outer circumference of the tool disc 410, which is engaged with a drive gear wheel, described in greater detail, of a drive unit, also not described in greater detail. On the inner circumference side of the central opening 412 a cam-track 412a is provided, which serves the actuation of the support device 500 explained in greater detail in the following. The cam-track 412a, moreover, has four recesses, provided in an even angle division, along the inner circumference of the central opening 412, forming discontinuities 412b.

By means of the tool disc 410, the clamping units 414 can assume four positions: a first position, in which a clamping unit 414 with a storage rod SP can be loaded, which is fed from the supply device 600, explained in greater detail in the following, for the storage rod SP; a second position, which is a testing position, in which a storage rod SP mounted in the clamping unit 414 is checked by the testing device 700 for its presence and/or its straightness; a loading position (third position), in which individual sausage products W can be loaded on the storage rod SP; and a delivery position (fourth position), from which a storage rod SP loaded with sausage products W for further processing of the sausage products W can be removed from the feeding machine B. These four positions are arranged in a division of 90° around the endless conveyor 310. In the following, the individual positions will be explained in greater detail in connection with the feeding device 600 for the storage rods SP, the testing device 700 and the description of the process for loading a storage rod SP with sausage products W.

Figure 6:
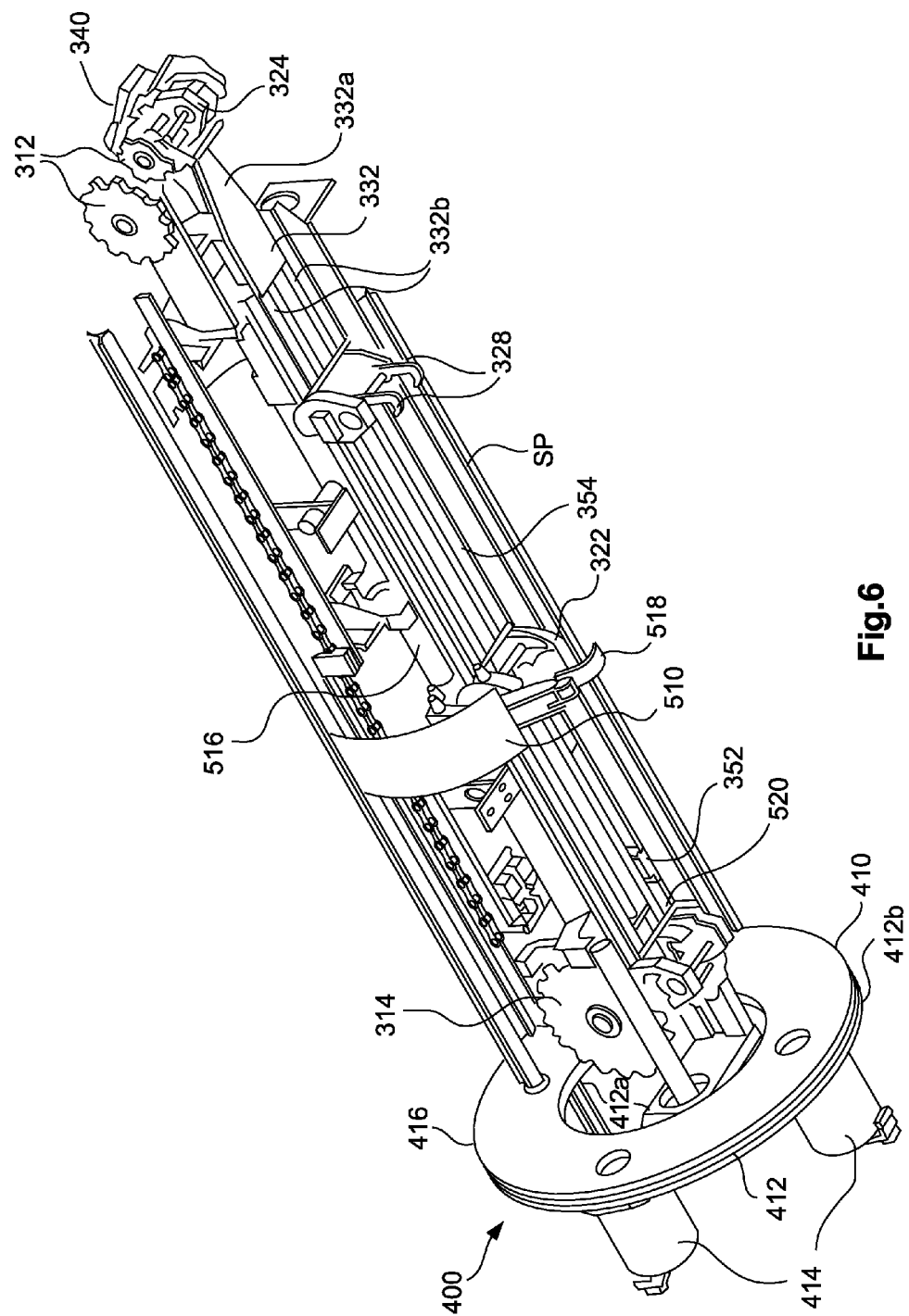
FIG. 6 is a schematic, perspective view of an endless conveyor and a turret device of an inventive feeding machine in a view from below.

The support device 500 has basically a support gripping member 510, which is located about in the middle between the two pinion pairs 312, 314, as can be seen in FIG. 6. The support gripping member 510 acts in a support position to prevent a storage rod SP from bending in the loading position. In addition, the support gripping member 510, in a vertical plane that intersects the imaginary central axis of the endless conveyor 310, is pivotable on a swiveling axis 516, which is aligned parallel to the endless conveyor 310 and is supported in an appropriate manner on the frame of the feeding machine B, rotatably fastened and sticking out from it essentially perpendicularly downwards. The support gripping member 510 can be moved reversibly around this swiveling axis 516 from a waiting position into the supporting position.

The support gripping member 510 is provided with a hook element 518 on its free end opposite the swiveling axis 516, which can be reversibly moved or pivoted from a waiting position into a support gripping position by means of a pneumatic cylinder. The hook element 518 assumes the latter position, when the support gripping member 510 is in the supporting position. This swivel movement of the hook elements 518 ensures that the hook element 518, during the movement of the support gripping members 510 into the supporting position, can travel under the particular storage rod SP without impediment. Through the swivel movement of the hook element 518 this comes reversibly into contact with the storage rod SP.

Moreover, the support device 500 has a locking bar 520. This extends axis-parallel to the endless conveyor 310. At one end is the locking bar 520 connected with the support gripping member 510 in such as manner that it can be moved reversibly together with the support gripping member 510 from the waiting position into the supporting position, but can be displaced axially vis-à-vis the support gripping member 510. At its other end is the locking bar 520, engaged with the cam-track 412a of the tool disc 412 via a cam 522 firmly attached to it. In the waiting position the cam 522 is in one of the recesses 412b of the cam-track 412a. As a result, the support gripping member 510 is kept in the waiting position. The recesses 412b identify the supporting position and the waiting position of the support gripping member 510.

The movement of the support gripping member 510 from the waiting position into the supporting position is also triggered by the release screw 352. To do this, the release screw 352, coming from the left with reference to FIG. 6, runs past the support gripping member 510 in the waiting position. As soon as the release screw 352 has passed the support gripping member 510, the release screw 352 pulls the locking bar 520 in an axial direction to the right with reference to FIG. 6. Consequently, the cam 522 disengages from the recess 412b of the cam-track 412a so that the support gripping member 510, as the result of its own weight, falls below into the supporting position. A drive to support this movement can be provided, which, for example, can be formed by a pre-tensioned torsion spring. Upon reaching the supporting position the cam 522 engages through a spring, not described in greater detail, with the next recess 412b of the cam-track 412a against the direction of rotation of the tool disc 410. By turning the tool disc 410 in a clockwise direction, when observed in the overhead view of the FIG. 6, approximately 90° at least, the support gripping member 510, as a result of the engagement of the cam 522 with the recess 412b, in which it arrived upon reaching the supporting position, is taken back into the waiting position.

Figure 11:
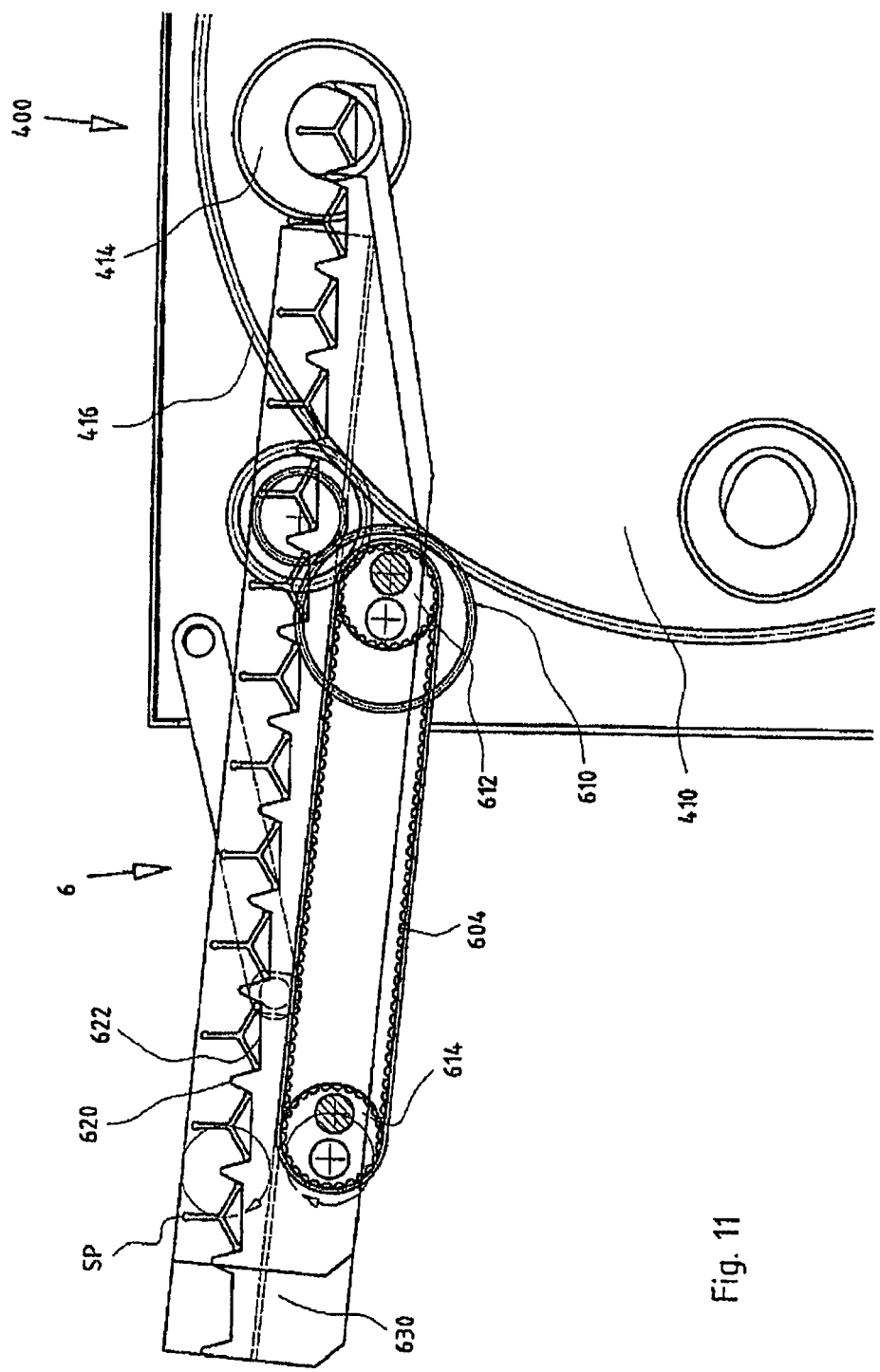
FIG. 11 is a schematic overhead view of a feeding device for storage rods in the feeding machine shown in the FIG. 2.

The feeding device 600 for the storage rods SP, to stock and feed storage rods SP for the turret device 400, is represented schematically in FIG. 11. The feeding device 600 is, with reference to the feeding machine B represented in FIG. 2, arranged before the endless conveyor 310, i.e., again with reference to FIG. 2, to the left of the endless conveyor 310. The device 600 contains at least one eccentric unit 610, at least two conveyor rods 620 as well as at least two fixed support elements 630. A conveyor rod 620 and a fixed support rod 630 together form a conveyor pair, which is arranged in the area of the front-facing ends of the feeding machine B in such a way that the central longitudinal axes of the rods 620, 630 run at least close to perpendicular to the imaginary central longitudinal axis of the endless conveyor 310, and the rods 620, 630 of the feeding machine B stick out to the left. The rods 620, 630 can be arranged slightly inclined if needed, as shown in FIG. 11, in order to assist the conveying process for the storage rods SP.

The fixed support elements 630 are arranged parallel to one another, so spaced that the storage rods SP deposited perpendicularly to them are held securely. As already mentioned, the support rods 630 are aligned perpendicular to the axes of the clamping units 414 of the turret device 400. Their feeding machine side ends extend to the tool disc 410.

The conveyor rods 620 are attached parallel to the fixed support rods 630 and in their immediate vicinity. They are aligned so that their feeding machine side ends, during the movement components generated at least close to horizontal by the eccentric unit 610, reach at the most the feeding machine side ends of the fixed support elements 630. The conveyor rods 620 have a uniform division, which was generated by recesses 622 or elevations protruding above, into each of which precisely one storage rod SP fits.

The conveyor rods 620 are driven by the eccentric unit 610. This has a first eccentric 612 that is aligned axis-parallel to the clamping units 414 and is arranged beneath the conveyor rod 620 in such a way that its outer circumference or eccentric surface is in contact with the conveyor rod 620. During the rotation of the eccentric 612 the conveyor rod 620 executes an intermittent movement. Due to the choice of the eccentric 612, this movement is so designed that the supply of storage rods SP lying on the rigid support elements 630 is transported step by step by the conveyor rods 620 around a specific path to the clamping units 414 of the turret device 400.

In the current example, a second eccentric 614 is provided in addition, which is also aligned axis-parallel to the clamping units 414 and via a belt drive 604, not described in greater detail, is connected with the first eccentric. At the same time, the eccentric unit 610 of the ring gear 416 of the tool disc 410 can be derived as needed by inserting a gear, not described in greater detail. Due to the drive of the eccentric unit 610 via the ring gear 416 of the turret device 400, during the delivery of a storage rod SP filled with sausage products W from a clamping unit 414 of the turret device 400 holding this storage rod SP, a coordinated feeding of an empty storage rod SP to a clamping unit 414 standing ready to take up this storage rod SP can occur. In the execution example shown, with a quarter-turn of the tool disc 410, precisely one conveyor process or conveyor cycle executed by the conveyor rods 620 occurs for the continued transport of the storage rods SP. As a result, the conveyor movement of the eccentric unit 610 is coordinated timewise with the turning movement of the tool disc 410. Moreover, only one drive is necessary for the turning of the tool disc 410 and the operation of the eccentric unit 610.

FIGS. 10a to 10d show a testing device 700 for checking the presence and the correct positioning of a storage rod SP in the clamping unit 414 of the turret device 400. The testing device 700 is arranged on the front-facing end of the feeding machine B opposite the turret device 400. It has basically a pot-shaped, cylindrical element 710 as well as a monitoring unit 712. The pot-shaped element 710 may be reversibly moved out, as represented in FIGS. 10a to 10d, perpendicular to the front-facing side of the housing wall, not described in greater detail, of the feeding machine B by means of a drive, also not described in greater detail. The inner diameter of the pot-shaped element 710 is greater than the external diameter of a storage rod SP so the pot-shaped element 710 can grip over a storage rod SP. In the process, the bottom 710a of the pot-shaped element 710 forms a stop for the storage rod SP.

On the bottom 710a of the pot-shaped elements 710 oriented toward the storage rod SP a short tapered portion 710b is provided, to which the back half 710c of the pot-shaped elements 710 is connected, which has a corresponding smaller diameter. Likewise, in this execution example, on the bottom 710a oriented toward the storage rod SP, three sensors 712a, 712b, 712c of the monitoring unit 712 are arranged in a plane perpendicular to the central axis of the pot-shaped elements 710. The first sensor 712a monitors the front part of the pot-shaped element 710, greater in diameter, the second and third sensors 712b, 712c the back part of the pot-shaped element 710, smaller in diameter. As a result, the monitoring unit 712 can chart the path covered by the pot-shaped elements 710 and thus determine if a storage rod SP is present and if it is correctly positioned. This is explained in the following in connection with FIGS. 10a to 10d.

In the initial position corresponding to FIG. 10a, the pot-shaped element 710 is located so far into the housing wall of the feeding machine B that it is arranged flush with its front side. Sensor 712c registers the front part of the pot-shaped element 710, greater in diameter. The two other sensors 712a, 712b record the back part of the pot-shaped element 710, smaller in diameter.

The case of the correct positioning of a storage rod SP is represented in FIG. 10b. The pot-shaped element 710 has emerged from the housing wall of the feeding machine B and surrounds the storage rod SP until it touches the bottom 710a of the element 710. The back end of the pot-shaped element 710 has disappeared from the sensor zone of the sensors 712a.

Likewise, the front part of the pot-shaped element 710, greater in diameter, has moved out of the detection zone of the sensor 712*c*. Only the sensor 712*b* is still registering the back part of the pot-shaped element 710. The resulting sensor signals indicate that the pot-shaped element 710 is moving around a permissible path from its initial position and is halted by a correctly inserted storage rod SP, as soon as the bottom 710*a* reaches it.

In FIG. 10*c* a tilted or bent storage rod SP mounted in a clamping unit 414 is indicated. The tilted or bent rod SP bumps against the outer edge of the pot-shaped element 710, with this not being able to emerge far enough from the housing wall of the feeding machine B as a result. In the case presented here, the pot-shaped element 710 has traveled out from the housing wall by a path that is short, as shown in FIG. 10*b*. The back end of the pot-shaped element 710 has disappeared from the sensor zone of the sensor 712*a*, but the sensor 712*c* still registers the presence of the pot-shaped element 710, just as sensor 712*b* does. This sensor result indicates clearly that a tilted or bent storage rod SP is present. This rod SP is discarded from the feeding machine B.

If no storage rod SP is mounted in a clamping unit 414, as portrayed in FIG. 10*d*, the pot-shaped element 710 emerges so far out of the housing wall of the feeding machine B that it cannot be detected by any of the sensors 712*a*, 712*b*, 712*c*. In this case a new storage rod SP is fed into and inserted by turning the tool disc 410 of the testing device 700, and the test is repeated.

Figure 5:
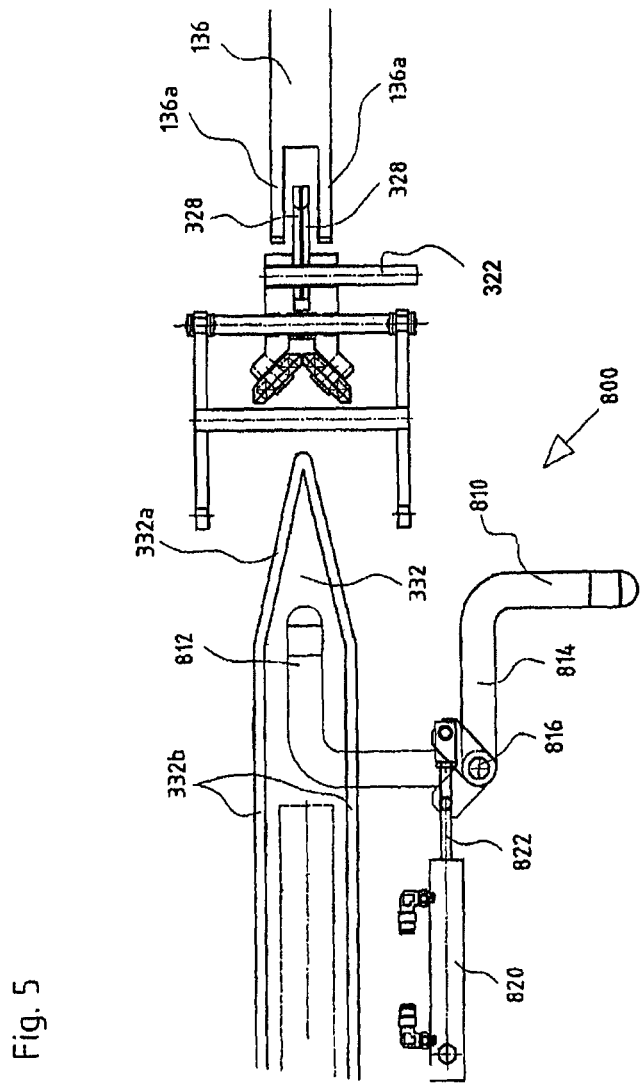
FIG. 5 is a schematic overhead view of the transfer position of the clip machine to the feeding machine shown in FIGS. 2a and 2b.

The weighing device 800 shown in FIG. 5 serves the arbitrary or regular removal and weighing of a sausage product W from the ongoing production in order to check its weight, that is, to check the filling of the correct filling material quantity. It is located beneath the front spreading bar section 332*a*. The weighing device 800 is comprised of a weighing lever 810, a drive shown in this representation as a hydraulic/pneumatic cylinder 820, and a weighing cell, not depicted.

The weighing lever 810 consists of a flat bar, preferably made of metal, that is angled in its main plane, which basically runs parallel beneath the spreading bar 332, approaching ca. 90° in the center. In the process it forms two ends, a front, free end 812 and a back end 814, which is connected with the axis of rotation of the weighing lever 810 so it can rotate. The axis of rotation is in the immediate vicinity of one of the endless chains 310*a*, 310*b*, arranged on its external side and aligned perpendicularly to the spreading bar 332. The cylinder 820 is parallel, arranged next to the endless conveyor 310. The piston rod 822 is connected by its retractable end with the back end 814 of the weighing lever 810 so that, upon entering the cylinder 820 with its front end 812, it swings into the transport path of the sausage product W. In this swung-in position, or also the weighing position, the front end 812 is aligned parallel to the direction of conveyance and points with its free end in the direction of the takeover position ÜB. In this position a sausage product W can be transferred from a conveyor element 320 to the weighing lever 810. If the piston rod 822 has emerged from the cylinder, the weighing lever 810 swings out of the direction of conveyance. In such an attainable final or standby position, the back end 814 of the weighing lever 810 is aligned parallel to the direction of conveyance, while the front end 812 is perpendicular to the side oriented toward this. The weight of the sausage product W presses the weighing lever 810 onto a weighing cell, not depicted, which then determines the exact weight of the sausage product W.

The circulation rate of the endless conveyor 310 is determined in its base setting by the feed rate of the flexible suspension elements AE in the clip machine B. This feed rate is detected by a control device, which derives the control for the circulation rate of the endless conveyor 310 from this. Since the circulation rate of the conveyor elements 320 is subject to disturbances, for example, disturbances as the result of wear and tear occurring or as a result of swinging movements of the sausage products W, which can lead to fluctuations in the circulation rate of the conveyor elements 320, it is advantageous if regulation is superimposed on the control of the circulation rate. The regulation can occur based on various regulating and reference input variables. For example, with regulation superimposed on the control of the circulation rate, it can be provided that the time for attaining a takeover position ÜB in the feeding machine B is regulated by the conveyor elements 320 for the continuous takeover of sausage products W. Thus it can be assured that a product W is always in the takeover position ÜB at the takeover time.

The actual regulation itself again can occur in different ways. Thus the regulation of the circulation rate of the conveyor elements 320 can be carried out, based on the deviation tendency of the interval of the conveyor elements 320 from the predetermined position on the transport path of the conveyor elements. For, by determining the deviation tendency, the influence of almost all disturbances on the circulation rate of the conveyor elements can be measured and corrected. The circulation rate of the conveyor elements is increased with an increase in the deviation tendency and reduced with the decrease in the deviation tendency.

Figure 12:
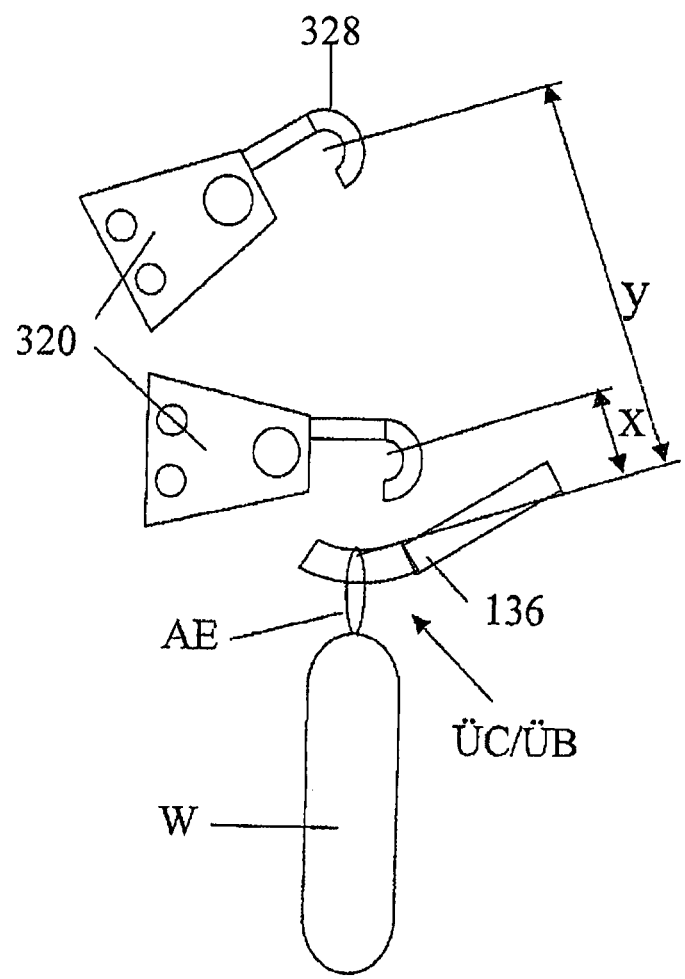
FIG. 12 is a schematic representation of a measuring principles for the determination of a deviation tendency of the conveyor elements of the endless conveyor of the feeding machine shown in the FIG. 2.

FIG. 12 illustrates the determination of the deviation tendency, which enters into in the regulation of the time the takeover position ÜB is reached by the conveyor elements 320. To do this, the distance 'x' of a conveyor element 320 from the predetermined position is measured, here ÜB, and compared with the distance 'y' of the following conveyor element 320 from the predetermined position ÜB. In the case represented, the takeover position ÜB is selected as the predetermined position. Furthermore, in the case represented, the center of a partial hook 328 is adopted as the measuring point. However, every other point of the conveyor element 320 can be used. Selectively the distance 'y' can also be the distance of the same conveyor element 320 from the predetermined position ÜB in the following circulation. In both instances a tendency can be determined by repeat measurement and a comparison of the differences, which arise, for example, due to slippage, wear and tear or strong swinging movements of the sausage products W suspended from the conveyor elements 320. The measurement of intervals and the comparison of the differences can occur continuously or at selected times. By determining the deviation tendency one obtains a reliable statement about the progression of the circulation rate and can have it flow into the regulation of the time the takeover position ÜB is reached.

Figure 13:
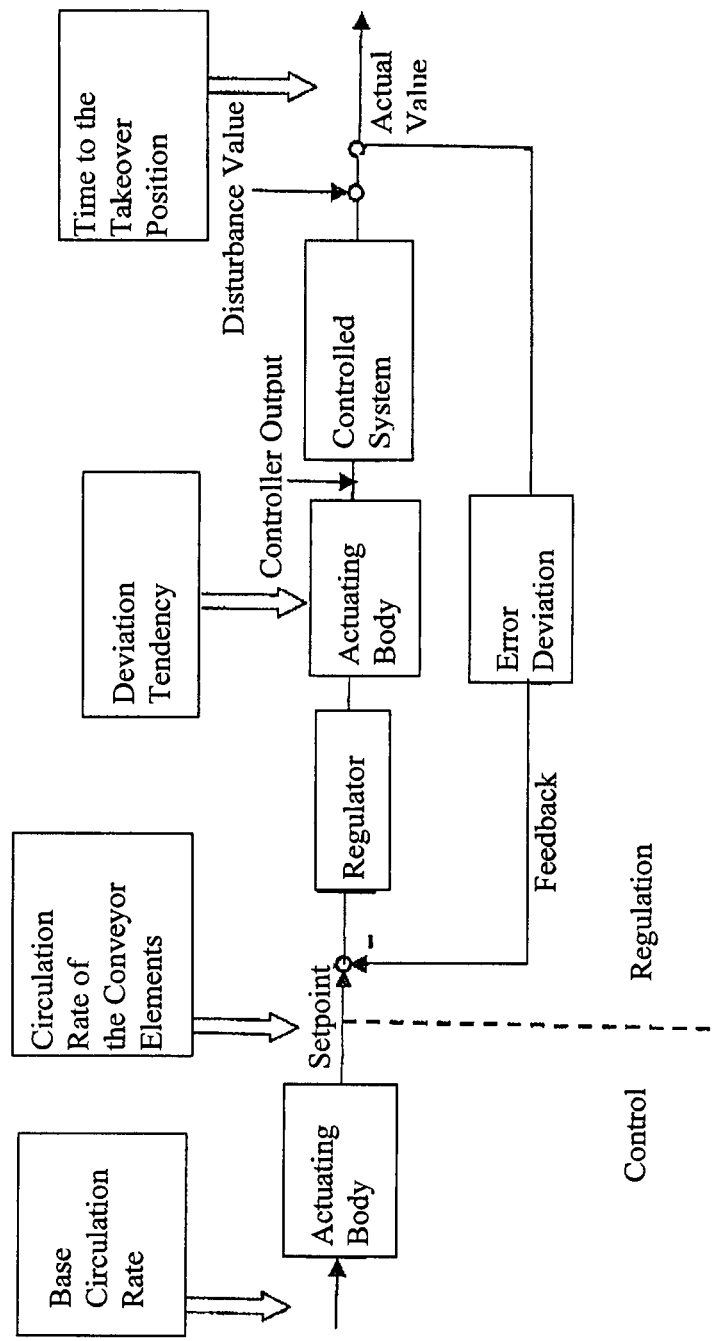
FIG. 13 is a block diagram of a new control system with superimposed regulation.

In FIG. 13 one can see a block diagram of the control of the circulation rate of the conveyor elements 320 and the regulation superimposed on it of the time the takeover position ÜB is reached. The circulation rate or base circulation rate of the conveyor elements 320 derived from the feed rate of the suspension elements AE flows as a setpoint value into the control circuit. With the aid of the deviation tendency explained in FIG. 12, the time the takeover position ÜB is reached can be precisely regulated.

Due to the control, first the circulation rate of the conveyor elements 320, corresponding to the feed rate or the feeding speed of the suspension elements AE, is set as the base setting, which in the present example corresponds exactly to the production rate, since precisely one suspension element AE is fastened to each sausage product W. In the case mentioned already, where the suspension elements AE are attached to each second, third, etc. sausage product W, a corresponding adjustment occurs.

In a completely disturbance-free flow of the overall process the aforementioned control would suffice. Due to various disruptive factors, such as slippage or wear and tear on the endless conveyor 310 as well as strong swinging movements of the sausage products W suspended from the conveyor elements 320, the circulation rate changes, resulting in a delay in the time the takeover position ÜB is reached. However, to achieve a correct transfer/takeover of the sausage products and attain continuous circulation of the conveyor elements 320, this time should be closely coordinated with the feed rate of the suspension elements AE.

To this end, a regulation of the time the takeover position ÜB is reached is superimposed on the control of the circulation rate, into which, as described above, the measured deviation tendency flows. Due to this regulation, deviations in the circulation rate, which are reflected in the deviation tendency, are compensated for. The circulation rate of the conveyor elements is increased with an increase in the deviation tendency and reduced with the decrease in the deviation tendency. To this end, the momentary actual value of the time the takeover position ÜB is reached is compensated for by an error measurement as a feedback variable to the setpoint value. The difference formed produces the regulating error, which is corrected via the deviation tendency acting as the regulating variable. In addition, through regulation it is possible to compensate for other disruptive factors that do not originate in the production process, such as fluctuations in current or mechanical influences that change the circulation rate. A continuously smooth takeover of products W without a start/stop operation is achieved, with the aforementioned disruptive factors being minimized or eliminated.

Independent of the control of the circulation rate with superimposed regulation of the time the takeover position ÜB is reached described above, a disconnecting procedure, which undertakes a controlled disconnecting of the individual components of the production line FCB in the event of a disturbance, is superimposed on the overall control of the production line FCB. During the disturbance-free operation a release signal on the filling machine F is on. If a disturbance in the feeding machine B occurs, then the release signal of the filling machine F is removed, and it stops any further feeding of filling material to the clip machine C. The clip machine completes the product currently in process and then also stops its operation. If a sausage product W happens to be in the transfer position ÜC, then this is removed from the transfer or takeover position ÜC or ÜB of the current conveyor element 320, and the feeding machine B stops the operation of the endless conveyor 310. If a sausage product W is removed by a conveyor element 320 from the transfer or takeover position ÜC/ÜB, then the operation of the endless conveyor 310 is stopped before the conveyor element 320 has reached the storage rod SP to be fed.

One proceeds in the same way when a clip signal is lacking. First the release signal is removed from the filling machine F, which consequently stops its operation. The clip machine C completes the product currently in process and then also stops its operation. Then the feeding machine B halts its operation according to the procedure depicted above.

The disconnecting procedure described makes it possible to shut off the production line FCB at any time in a controlled and safe manner during the occurrence of a disturbance. In addition, the method of disconnecting the components makes it possible to have a problemless restart of the production line FCB without the risk of a repeat disturbance from products still to be found in the production line FCB.

The production flow of the production line from the manufacturing to the deposition of a sausage product W happens as follows:

A flowable filling material, here sausage meat, is fed from the filling machine F via the filling pipe FR to the clip machine C. Around the filling pipe FR there is the supply of tubular wrapper material (not shown). This is filled in the known manner. Through the simultaneous placing and closing of two clips in the clip machine C, a sausage product W that has just been filled is completed and, a starting point is created for a product W that has yet to be filled. During the placing and closing of the clips a suspension element AE in the form of a thread loop is fed into the clip finishing the sausage product W via the feeding device ZE and is fastened with this clip to the sausage product W.

After a sausage product W has been finished by placing and closing the clips, attaching a suspension element AE and separating the sausage product W from the supply of the other wrapper material in the clip machine C, it is transported with the end opposite the suspension element AE facing ahead on the conveyor belt 110 of the delivery path AS, which runs parallel to the guide track 130, from the clip machine C in the direction of the feeding machine B. In the process, the loop of the suspension element AE is captured by the threading cone 134 and guided via the guide track 130. While passing through the bearing devices 140 the suspension element AE is forcibly guided by the rotation of the hollow shaft 160 and the thread-shaped circumferential groove 162 applied to its surface through the bearing devices 140. At the end of the conveyor belt 110 the sausage product W then falls below by means of gravity from the conveyor belt 110, where it continues on, suspended by the suspension element AE, along the guide track 130. With the suspension element AE it slides along through the angled part of the guide track 130 set up below until it has reached the transfer position ÜC at the fork-shaped element 136. If there is a sausage product W in the transfer position ÜC, this is detected by the sensor 138.

The partial hooks 328 of a conveyor element 320, located right before the takeover position ÜB, are moved out of the folded back position by means of the hook straightening element 340 into the position holding a suspension element AE. At the same time, the partial hooks 328 are in the position where they are lying next to one another. As a result, during the continuous further conveyance of the conveyor elements 320, the partial hooks 328 can travel through the fork-shaped element 136, thus picking up the sausage product W via the sections of the suspension elements AE lying crosswise over the tines 136a as well as transporting it into the feeding machine B.

On its transport path along the endless conveyor 310 the conveyor element 320 then passes the spreading bar 332. This presses with its front triangular section 332a between the bearing and guide rollers 330 of the conveyor elements 320 and thus presses the bearing walls 324 and the partial hooks 328 of the conveyor elements 320 apart. In the process, the bearing and guide rollers 330 glide along on the inclines of the guide tracks 332b of the spreading bar 332 and are spread until the end of the spreading bar 332 or the rear triangular section 332a has been reached.

Figure 6A:
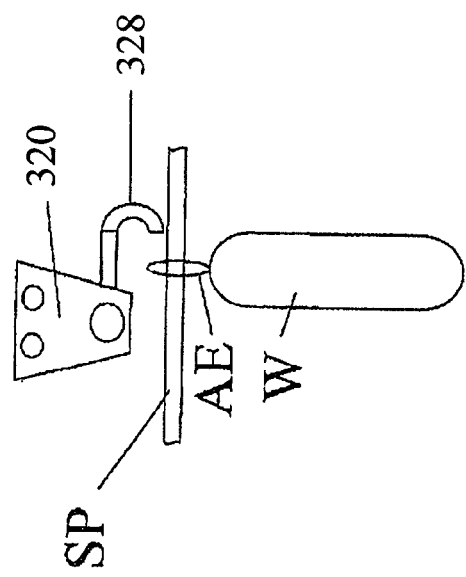
FIG. 6a is a schematic representation of a transfer position of a conveyor element of the endless conveyor of the feeding machine shown in FIG. 6 to a storage rod in the feeding machine.

By spreading the partial hooks 328 the loop of the suspension elements AE is opened far enough that it can be guided over the storage rod during the further conveyance of the conveyor element 320. In coordination with the filling level of the storage rods SP the release screw 352 is guided against the direction of conveyance of the conveyor elements 320 or the sausage products W on the spindle 354, which is located quite close to the lower strand of the endless conveyor 310 and parallel to it. Upon reaching the release screw 352, the conveyor element 320 with its trigger nose 336b glides over the release screw 352. As a result, the mechanism for turning over or folding back the partial hooks 328 from the position holding the sausage products W is triggered into the release position. By turning away the partial hooks 328 the sausage product W is released and deposited on the storage rod SP in the predetermined position (cf. FIG. 6a).

Once a specific filling level of the storage rod SP has been reached, for example, 50% of the storage rod SP is filled with sausage products W, then the release screw 352 triggers the support gripping member 510 located in this position, which is in the waiting position at the start of the filling of a storage rod SP. This moves out of the waiting position into the supporting position. The triggering occurs by the release screw 352 pulling the locking bar 520 out of the recess 412b in the cam-track 412a. By means of gravity as well as an available drive, as needed, the support gripping member 510 is moved out of the waiting position into the supporting position, and the locking bar 520 engages the next recess 412b.

After the storage rod SP is completely filled, the tool disc 410 is turned by the drive of the ring gear 416 about 90° in a clockwise direction, as seen from the orientation in FIG. 2. The support gripping member 510, which is still being held by the locking bar 520 held in the recess 412b, is moved back into the waiting position.

An empty storage rod SP located in the next clamping unit 414 is brought into the filling position, and the filled rod SP is removed from the corresponding clamping unit 414, for example, transported away by a corresponding conveyor device. During the turning of the tool disc 410, a filled storage rod SP is moved out of the filling position, while an empty rod SP is moved at the same time into the filling position. Due to a coupling of the eccentric unit 610 of the feeding device 600 to the drive for the tool disc 410, empty storage rods SP are transported into the turret unit 400. With the correspondingly designed coupling, during the removal of a filled storage rod SP, exactly one new storage rod SP is inserted from the supply of the storage rods SP lying on the support rods 630 into the testing position in the turret 400. As a result, an as-needed feeding of empty storage rods to the feeding machine, coordinated with the production flow, is achieved.

With the turning of the tool disc 410, the storage rod fed into a clamping unit 414 from the feeding device 600 for empty storage rods SP in the previous cycle is transported from this feeding or loading position into the testing position. There the test takes place to see if a storage rod SP is present at all, is correctly mounted and/or is bent. During the next cycle the storage rod SP located in the testing position is guided into the loading position for loading or feeding with sausage products W. Then, as described, the loaded storage rod SP is delivered into the position for removal from the feeding machine B.

In order to ensure a consistently uniform quality, it is possible to weigh and check individual sausage products W during the ongoing production to see if the correct quantity of filling material was inserted into the wrapper material. The weighing device 800 described above, using FIG. 5, serves this purpose. During the normal production flow the weighing lever 810 of the weighing device 800 is in the standby position described above. If a sausage product W is to be weighed now, the piston rod 822 is introduced in the weighing device by actuating the cylinder 820. In the process, the weighing lever 810 is swung into the direction of conveyance of the sausage products W so that the front end is aligned parallel to this and points to the transfer point ÜC of the clip machine. From the conveyor element 320, which has just taken a sausage product W over from the takeover point ÜB, the product W is transferred to the weighing lever. By a repeat actuation of the cylinder 820 through the introduction of the piston rod 822, the weighing lever 810 is conveyed back into the standby position. The sausage product W, suspended from the weighing lever 810, activates the weighing cell, which determines the weight.

In case of a disturbance, no matter what kind it is, the disconnecting procedure, already described above, intervenes, assuring a risk-free stoppage of the components of the production line as well as a risk-free renewed startup.

In conclusion, it should also be noted that the invention is not limited to the executions depicted in the Figures. Therefore, another transport means instead of a chain can be selected for the endless conveyor, for example, a toothed belt, which does not have to be executed as two parallel belts running next to one another. The turret can contain more or less than four clamping elements just as the feeding device can contain more than two rigid support elements and conveyor rods.

The invention claimed is:
1. Production line for the manufacturing of sausage-shaped products, which receive a flowable filling material in a tubular wrapper material, the production line comprising:
  a clip machine, in which the wrapper material filled with the filling material is divided into portions into individual sausage-shaped products by placing closing clips and is separated from the supply of the remaining wrapper material, enabling at least one flexible suspension element to be applied to the sausage-shaped product during the placing of the closing clips, while the product is fed in a timed manner into the clip machine, the clip machine comprising:
    at least two sealing tools, movable relative to one another between a opening position and a closing position for the placing and closing of clips on a sausage-shaped product;
    at least one clip storage device from which clips can be fed to a sealing tool;
    a storage device for storing a supply of wrapper material;
    a separation device for separating an individual sausage product from the supply of wrapper material;
    a filling pipe for the feeding of filling material;
    a delivery device for delivering sausage-shaped products from the clip machine along a delivery path for the sausage-shaped products; and
    a feeding device for flexible suspension elements from which said at least one suspension element can be fed,
    the delivery path for the sausage-shaped products including a first transport path for the sausage-shaped products and, parallel to the first transport path for the sausage-shaped products, a transport path, separate from the first transport path for the sausage-shaped products, for the suspension elements connected to a sausage-shaped product;
  a feeding machine supplying storage rods individually for further processing of the sausage-shaped products and having conveyor elements, circulating continuously along a transport path, which is used to supply the storage rods with sausage-shaped products, the conveyor elements take the sausage-shaped products proceeding out of the clip machine into a takeover area provided between the clip machine and the feeding machine; and a control device configured to control at least the circulation rate of the conveyor elements of the feeding machine on the basis of a control variable derived from the clip machine;

wherein the control device is configured to override a regulation on the control of the circulation rate, and wherein the regulation is configured to regulate the circulation rate of the conveyor elements on the basis of the deviation tendency of the distance of the conveyor elements from a predetermined position on the transport path of the conveyor elements.

2. A production line according to claim 1, where the control device is capable of coordinating at least the operation of the feeding machine and the clip machine with one another.

3. A production line according to claim 1, where the transport path between the clip machine and the feeding machine is interrupted.

4. A production line according to claim 3, where the interruption of the transport path between the clip machine and the feeding machine is formed by the takeover area, in which the transport path of the clip machine ends in a transfer position and in which the conveyor elements of the feeding machine, in a takeover position in regard to the feeding machine, take over individually the sausage-shaped products that are in the transfer position in regard to the clip machine.

5. A production line according to claim 1, further comprising:

a filling machine capable of feeding filling material to the wrapper material in the clip machine, the filling machine being arranged upstream from the clip machine in the production line.

6. A production line according to claim 1, where the first transport path for the sausage-shaped products and the transport path for the suspension element associated with a sausage-shaped product ends in a transfer position, in which a sausage-shaped product can be kept ready in a defined manner for the transfer for further processing.

7. A production line according to claim 6, the clip machine further comprising:

at least one transfer device having a fork-shaped design on its end oriented to the clip machine and positioned at the transfer position for the transfer of the sausage-shaped products.

8. A production line according to claim 6, the clip machine further comprising:

at least one sensor capable of detecting the presence of a sausage-shaped product and positioned at the transfer position.

9. A production line according to claim 1, where the transport path for the suspension elements contains a guide track having a circular cross-section.

10. A production line according to claim 9, where the guide track has at least two bearing devices.

11. A production line according to claim 10, where the bearing devices each include three support rollers, arranged in a uniform distribution in the circumferential direction of the guide track.

12. A production line according to claim 10, where the guide track has a drivable hollow shaft in the area of the bearing devices, the hollow shaft being arranged coaxially to the guide track.

13. A production line according to claim 12, where the guide track includes a thread-shaped circumferential groove in the area of the bearing devices.

14. A production line according to claim 13, where the thread-shaped circumferential groove is positioned about the hollow shaft.

15. A production line according to claim 11, where the guide track in the area of the support rollers has a convex surface, and the support rollers have a corresponding concave surface.

16. A production line according to claim 10, where the guide track is angled between the two bearing devices.

17. A production line according to claim 11, where at least one of the support rollers of each bearing device is drivable.

18. A production line according to claim 9, where the guide track includes a threading cone on the clip machine side end.

19. A production line according to claim 9, the clip machine further comprising:

a catch device for the suspension elements connecting to the clip machine end of the guide track, and extending from the guide track into the closure area of the sealing tools.

20. A production line according to claim 19, where the catch device is angled and has a cone-shaped catch point.

21. A production line according to claim 9, where the suspension elements are thread loops.

22. Production line for the manufacturing of sausage-shaped products, which receive a flowable filling material in a tubular wrapper material, the production line comprising:

a clip machine, in which the wrapper material filled with the filling material is divided into portions into individual sausage-shaped products by placing closing clips and is separated from the supply of the remaining wrapper material, enabling at least one flexible suspension element to be applied to the sausage-shaped product during the placing of the closing clips, while the product is fed in a timed manner into the clip machine;

a feeding machine supplying storage rods individually for further processing of the sausage-shaped products and having conveyor elements, circulating continuously along a transport path, which is used to supply the storage rods with sausage-shaped products, the conveyor elements take the sausage-shaped products proceeding out of the clip machine into a takeover area provided between the clip machine and the feeding machine; and a control device configured to control at least the circulation rate of the conveyor elements of the feeding machine on the basis of a control variable derived from the clip machine;

wherein the control device is configured to override a regulation on the control of the circulation rate, wherein the regulation is configured to regulate the circulation rate of the conveyor elements on the basis of the deviation tendency of the distance of the conveyor elements from a predetermined position on the transport path of the conveyor elements, wherein the sausage-shaped products have a flexible suspension element on one of their ends, which can be guided via a storage rod and which can assume a closed and an open embodiment;

the feeding machine comprising:

a device for mounting one end of a storage rod that is free at the other end, and a device for feeding the sausage-shaped products, suspended from their suspension elements, one after the other to the storage rod and, under guidance of the suspension elements, depositing the suspension elements over the free end of the storage rod at spaced positions along the storage rod, the device for feeding the sausage-shaped products comprising:

an endless conveyor with a strand running parallel to the storage rod;

the endless conveyor having conveyor elements spaced at intervals to receive the suspension elements of sausage-shaped products one after the other;

the conveyor elements being movable from a position holding the sausage-shaped products by their suspension elements into a position depositing the suspension elements onto the storage rod;

at least one control element at spaced intervals along the storage rod producing the movement of the conveyor elements into their depositing position; and the conveyor elements having hooks that are pivotable around horizontal axes from their position holding the suspension elements into their position depositing the suspension elements, and the at least one control element is a moving trigger element along the strand of the endless conveyor against its forward direction, which triggers the movement of the hooks from their holding into their depositing position.

23. A production line according to claim 22, where the hooks are each comprised of two identical partial hooks that, before reaching a takeover position from the feeding machine, in which the sausage-shaped products can be taken over by their suspension elements by the conveyor elements, are congruent with one another and, after leaving the takeover position, are capable of spreading crosswise to the span of the strand against a spring force into a position keeping the suspension elements open.

24. A production line according to claim 23, the feeding machine further comprising:

an actuating body, arranged in the return direction of the endless conveyor before the takeover position for the suspension elements, capable of moving the hooks, after the deposition of the sausage-shaped products on the storage rod, back into their position holding the suspension elements.

25. A production line according to claim 22, where the endless conveyor is a chain running around a drive disc and a turnaround disc, both discs being rotatable around horizontal axes.

26. A production line according to claim 22, the feeding machine further comprising:

a supporting device which, after the partial feeding of a storage rod, can be pivoted in reverse on this device, between its ends, from a waiting position into a supporting position.

27. A production line according to claim 26, where the supporting device can be moved into the supporting position by means of gravity and into the waiting position by means of a motor drive.

28. A production line according to claim 27, where the movement of the supporting device into the supporting position is supported by an elastic pre-tensioning force, which is reproducible by the motor drive.

29. A feeding machine according to claim 27, where the supporting device is driven from a drive of the feeding machine.

30. A production line according to claim 26, where the movement of the supporting device from the waiting position into the supporting position is triggered by the trigger element.

31. A production line according to claim 26, where the supporting device includes a locking device that reversibly locks the supporting device in the waiting position.

32. A production line according to claim 26, where the movement of the supporting device is guided along a continuous cam-track.

33. A production line according to claim 32, where the cam-track for the supporting device has at least two discontinuities defining the waiting position and the supporting position.

34. A production line according to claim 26, where the device for the end mounting of a storage rod is part of a turret device with four clamping units, which can be rotated into a least in a mounting position, a feeding position and a delivery position, and a testing position provided between the mounting position and the feeding position.

35. A production line according to claim 34, where the turret device has a motor drive, moving the supporting device from the supporting position into the waiting position.

36. A production line according to claim 34, the feeding machine further comprising:

on the side of the feeding machine opposite the turret device a testing device, the testing device capable of detecting at least the presence of a storage rod.

37. A production line according to claim 36, where the testing device is capable of detecting the alignment of the storage rod.

38. A production line according to claim 36, where the testing device is capable of removing an incorrectly positioned storage rod and/or a storage rod having an incorrect alignment from the turret device.

39. A production line according to claim 36, where the testing device is capable of controlling the feeding of the storage rods so that at least one storage rod is always correctly positioned in the feeding position.

40. A production line according to claim 36, where when in the testing position, the storage rod in the clamping unit can be shifted axially by its free end into a test cup of the testing device, and, in case of an impediment in the shifting, can be discarded.

41. A production line according to claim 22, where the conveyor elements for the transfer of the sausage-shaped products onto the storage rod are guided in parallel past the storage rods.

42. A production line according claim 23, where the partial hooks of the conveyor elements are capable of being spread immediately before reaching the storage rod.

43. A production line according to claim 42, the feeding machine further comprising:

a trapeze-shaped spreading bar capable of spreading the partial hooks.

44. A production line according to claim 42, where the spread partial hooks of the conveyor elements are capable of being compressed together again upon reaching the end of the storage rod.

45. A production line according to claim 44, where the compression of the spread partial hooks of the conveyor elements is carried out by means of a pre-tensioned spring.

46. A production line according to claim 23, where the trigger element is a release screw, upon the reaching the release screw a conveyor element releases the sausage-shaped product for deposition on the storage rod by folding back the hooks.

47. A production line according to claim 46, where the release screw is guided on a spindle.

48. A production line according to claim 46, where the release screw is capable of being moved against the movement direction of the conveyor elements so that an even filling of the storage rods occurs.

49. A production line according to claim 46, where the release screw is positioned to actuate a mechanism that causes the folding of the hooks of the conveyor elements.

50. A production line according to claim 46, where the conveyor element includes a catch device securing the hooks of the conveyor element in the folded position as well as a catch device securing the hooks of the conveyor elements in a set-up position as needed.

51. A production line according to claim 46, where the conveyor element is positioned, right before reaching the takeover position, to pass by a hook straightening element, which straightens the folded back hooks once again for the release of the sausage-shaped products.

52. A production line according to claim 51, where the conveyor element includes a catch device, securing the hooks of the conveyor element in the straightened position.

53. A production line according to claim 35, the feeding machine further comprising:
a feeding device for the storage rods, capable of feeding the storage rods in coordination with the work cycle of the feeding machine.

54. A production line according to claim 53, where the feeding device is positioned to feed the storage rods axis-parallel to the clamping units of the turret device to the turret device and to insert the storage rods coaxially to one clamping unit into the feeding machine.

55. A production line according to claim 53, where the feeding device includes at least two fixed support elements provided with uniform divisions, on which a supply of storage rods is deposited axis-parallel to the filling direction.

56. A production line according to claim 53, where the feeding device includes at least two conveyor rods provided with uniform divisions, and capable of transporting the storage rods into the feeding machine with an intermittent movement.

57. A production line according to claim 56, where the feeding device includes at least one eccentric capable of generating the intermittent movement.

58. A production line according to claim 57, where the at least one eccentric is capable of being driven by a belt drive.

59. A production line according to claim 58, where the belt drive is driven from the drive of the turret device.

60. A production line according to claim 23, the feeding machine further comprising:
in the area of the takeover position, a weighing device for the sausage-shaped products, the weighing device being capable of measuring the weight of an individual sausage-shaped product selectively.

61. A production line according to claim 60, where the weighing device has a weighing lever, pivotable into the movement path of a conveyor element, to which a sausage-shaped product to be weighed can be transferred by the conveyor element.

* * * * *